United States Patent
Suzuki et al.

(10) Patent No.: US 6,730,404 B1
(45) Date of Patent: May 4, 2004

(54) COMPOSITE ACTIVE MATERIAL AND PROCESS FOR THE PRODUCTION THEREOF, ELECTRODE AND PROCESS FOR THE PRODUCTION THEREOF, AND NON-AQUEOUS ELECTROLYTE BATTERY

(75) Inventors: Isao Suzuki, Kyoto (JP); Shuji Hitomi, Kyoto (JP); Syozo Hashizume, Osaka (JP); Eriko Yagasaki, Osaka (JP)

(73) Assignees: Japan Storage Battery Co., Ltd., Kyoto (JP); The Kansai Electric Power Co., Ltd., Osaka (JP)

( * ) Notice: Subject to any disclaimer, the term of this patent is extended or adjusted under 35 U.S.C. 154(b) by 0 days.

(21) Appl. No.: 09/674,605

(22) PCT Filed: Mar. 3, 2000

(86) PCT No.: PCT/JP00/01278

§ 371 (c)(1),
(2), (4) Date: Nov. 3, 2000

(87) PCT Pub. No.: WO00/52774

PCT Pub. Date: Sep. 8, 2000

(30) Foreign Application Priority Data

Mar. 4, 1999  (JP) ......................................... P.11-057715

(51) Int. Cl.$^7$ ........................ H01M 4/02; H01M 4/36; H01M 4/48; H01M 4/58; H01M 4/62
(52) U.S. Cl. .................... 428/421; 428/304.4; 428/402; 428/403; 428/407; 429/209; 429/212; 429/217; 429/218.1; 429/231.4; 429/231.8; 429/231.9; 429/231.95; 429/249; 429/250
(58) Field of Search ................................. 428/421, 422, 428/621, 624, 626, 632, 633, 634, 678, 304.4, 305.5, 306.6, 307.3, 308.4, 319.1, 402, 403, 407; 429/209, 212, 217, 218.1, 231.4, 231.8, 231.9, 231.95, 249, 250

(56) References Cited

U.S. PATENT DOCUMENTS 5,605,772 A  *  2/1997  Yazami et al. ............... 429/212
5,618,640 A      4/1997  Idota et al.

(List continued on next page.)

FOREIGN PATENT DOCUMENTS

| CN | 1209659 A | 3/1999 |
| EP | 0 880 186 A1 | 11/1998 |
| JP | 08-148153 | * 6/1996 |
| JP | 8-213001 A | 8/1996 |
| JP | 9-219197 A | 8/1997 |
| JP | 10-270054 | * 10/1998 |
| JP | 10-316793 A | 12/1998 |
| JP | 11-26025 A | 1/1999 |
| JP | 11-149942 | 6/1999 |
| JP | 11-279785 | * 10/1999 |

OTHER PUBLICATIONS

The 40$^{th}$ Battery Symposium in Japan, Nov. 14–16, 1999, Kyoto, pp. 497–498, article entitled "Positive and Negative Active Materials Coated with Porous Polymer Electrolyte for Lithium Ion Cells", by Suzuki et al., and an English summary thereof.

*Primary Examiner*—Vivian Chen
(74) *Attorney, Agent, or Firm*—Sughrue Mion, PLLC

(57) ABSTRACT

The high rate discharge performance and cyclability are improved. A battery having a hich capacity density and excellent cyclability and safety performance can be produced. A composite active material provided with a polymer on the surface of a carbon-based active material in an amount of from 0.01% to 5% by weight is used. Further, a composite active material provided with a polymer on the surface of a carbon-based active material in an amount of from 0.04 to 4% by weight is used. In particular, the former composite active material is used as a positive active material while the latter composite active material is used as a negative active material to obtain a non-aqueous electrolyte battery.

4 Claims, 8 Drawing Sheets

U.S. PATENT DOCUMENTS

| | | |
|---|---|---|
| 5,677,084 A | 10/1997 | Tsukamoto et al. |
| 5,698,339 A | 12/1997 | Kawakami et al. |
| 5,702,845 A * | 12/1997 | Kawakami et al. ......... 429/209 |
| 5,795,679 A | 8/1998 | Kawakami et al. |
| 5,900,335 A * | 5/1999 | Nishimura et al. ...... 429/231.4 |
| 6,090,506 A * | 7/2000 | Inoue et al. ................. 429/137 |
| 6,261,722 B1 * | 7/2001 | Dasgupta et al. ........... 429/217 |
| 6,436,572 B1 * | 8/2002 | Iyori et al. .................. 429/213 |

* cited by examiner

COMPOSITE ACTIVE MATERIAL AND PROCESS FOR THE PRODUCTION THEREOF, ELECTRODE AND PROCESS FOR THE PRODUCTION THEREOF, AND NON-AQUEOUS ELECTROLYTE BATTERY

TECHNICAL FIELD

The present invention relates to an active material and a process for the production thereof, an electrode and a process for the production thereof, and a non-aqueous electrolyte battery.

BACKGROUND OF ART

With the recent remarkable development of portable electronic apparatus, there has been an urgent demand for the enhancement of the performance of battery used as power supply for these portable electronic apparatus. A secondary lithium battery comprising lithium as a negative active material, which shows the lowest electrode potential in metals and a small specific gravity, has been expected as one of batteries meeting this demand. However, the problem of the battery are low cyclability and poor safety performance because of formation of dendritic lithiums during charge-discharge cycle.

Therefore, a secondary lithium ion battery comprising a carbon material such as graphite and carbon as a negative active material on which dendritic lithium can hardly be deposited, and lithium cobaltate and lithium nickelate as a positive active material has been developed. In recent years, this type of a battery has been used as a high energy density battery.

The positive active material to be used in non-aqueous electrolyte batteries such as lithium ion battery has a low electronic conductivity and thus is applied to a current collector such as aluminum in admixture with an electroconductive material such as acetylene black. A non-aqueous electrolyte battery such as lithium ion battery is composed of various materials such as active material, electroconductive material, binder, current collector and separator.

However, due to the difference in materials, the various materials have drastically different wettability with the electrolyte, making it impossible for the each component of cells to wet uniformly with the electrolyte and hence causing nonuniform current distribution. Therefore, current can be concentrated on local points, deteriorating the high rate discharge performance of the battery.

Further, since the amount of the electrolyte in the battery decreases during cycle life test, the electrolyte on the area having a poor wettability with the electrolyte is absorbed by the area having a good wettability with the electrolyte, making a local insufficiency of the electrolyte and hence deteriorating the cycle life performance of the battery.

Moreover, the foregoing problems make it difficult to decrease the amount of the electrolyte in the battery.

Accordingly, a method of improving the safety by decreasing the amount of a inflammable organic electrolyte cannot be employed.

Further, in the case where a carbon material is used as a negative active material, the electrolyte can be decomposed on the surface of the carbon material during the first charge. irreversible reactions that a film is formed by the decomposed products on the surface of the carbon material occur. Therefore, the reversible capacity of the battery is reduced because of the limitation of the amount of lithium contained in the positive active material.

The secondary lithium ion battery comprising a carbon material as a negative active material is safe as compared with the secondary lithium battery comprising metallic lithium as a negative active material. However, when the temperature of the battery comprising a carbon material was increased by heating from the outside or internal short-circuit, thermal runaway at the positive electrode is occurred by exothermic reaction of lithium-inserted carbon with electrolyte. In order to prevent this trouble, other safety means are provided.

The reaction of the carbon material with the electrolyte occurs on their interface. Accordingly, by coating the surface of the carbon material with a polymer, the irreversible capacity of the negative electrode can be reduced, making it possible to inhibit the exothermic reaction.

For example, techniques have been disclosed which comprise coating the surface of a carbon material capable or lithium insertion and extraction with a polymer electrolyte (JP-A-7-235328 (The term "JP-A" as used herein means an "unexamined published Japanese patent application") or coating the surface of a carbon material with a polymer film made of a polymer and an alkaline metal salt (JP-A-8-306353) to prevent the production of gas from the negative electrode during first charge.

However, even the use of these techniques cannot sufficiently inhibit the deterioration of high rate discharge performance, cyclability and life and the reaction of carbon material, if used in a negative electrode, with the electrolyte.

The present invention is intended to solve the foregoing problems.

DISCLOSURE OF THE INVENTION

The present invention has been worked out on the basis of the discovery that the reason why the foregoing problems cannot be solved by the method involving the coating the surface of active material with a polymer is that the amount of the polymer applied is improper or the method for producing the polymer coating is improper. Further, the present invention has been worked out on the basis of the discovery that when a proper amount of a polymer is used or a proper method of the producing is employed, the form or material of the polymer used can be properly predetermined, making it possible to further improve the performance of the active material.

The composite active material of the present application is provided with a polymer on the surface thereof in an amount of from 0.01% to 5% by weight.

Such a composite active material can be used as the active material for non-aqueous electrolyte battery for example to solve the foregoing problems attributed to wettability with electrolyte.

The polymer content is preferably from 0.1% to 1% by weight. The foregoing composite active material according to the present application preferably acts as a positive active material.

In the case where the active material is a carbon-based active material, the content of the polymer to be provided on the surface thereof is more preferably from 0.04% to 4% by weight. Such a composite active material can be used as the negative active material for non-aqueous electrolyte battery to solve the foregoing problems attributed to the reaction with the electrolyte, not to mention the foregoing problems attributed to wettability.

The term "content" as used herein is meant to indicate the percentage of the weight of the polymer provided on the surface of the composite active material based on the weight of the composite active material.

The composite active material according to the present application is provided with a polymer on the surface thereof. In this arrangement, by using the polymer as electrolyte and providing the polymer with pores for retaining the electrolyte and forming ion passage, she distribution of the electrolyte on the surface of the active material can be rendered uniform. In the case where the polymer is used as electrolyte or other cases, it is effective to render the polymer porous. This effect is caused by the polymer which enhanced the capability of the composite active material of retaining the electrolyte and facilitated the movement of ions to the active material.

In the composite active material according to the present application, the polymer preferably comprises fluorine incorporated therein whichever structure it has. This is because such a polymer has an excellent durability. The composite active material according to the present application is preferably provided with such a polymer particularly when used as the active material for non-aqueous electrolyte battery.

The process for the production of the composite active material according to the present application comprises providing a polymer solution on the surface of the active material.

In accordance with this process, the surface conditions of the composite active material can be optimized, making it possible to effectively accomplish the function of the polymer. This process can be applied also to the production of an active material having a size as small as molecular level.

This process is suitable for the production of the composite active material according to the present application and is advantageous in that the polymer content can be controlled merely by adjusting the concentration of the solution.

The viscosity of the polymer solution to be used in his process is preferably 20 mPa·s or less, more preferably 10 mPa·s or less. The active material is preferably dipped in a polymer solution having a viscosity within the above defined range to provide the polymer solution on the surface of the active material.

Regardless of whatever process is employed, the process for providing the polymer solution on the surface of the active material preferably comprises a first dipping step at which the active material is dipped in the polymer solution in a first pressure atmosphere and a second dipping step at which the active material is dipped in the polymer solution in a second pressure atmosphere having a pressure greater than that of the first pressure atmosphere. The first dipping step is preferably followed by the second dipping step to provide the polymer solution on the surface of the active material.

In the process for the production of the composite active material, the polymer solution provided on the surface of the active material is preferably followed by the phase separation of the polymer from the polymer solution provided on the surface of the active material.

The foregoing phase separation is preferably carried out by dipping the active material provided with the foregoing polymer solution in a non-solvent for the polymer contained in the polymer solution.

The electrode according to the present application comprises a composite active material of the present application or an active material produced by the production process of the present application. The electrode according to the present application is suitable particularly for non-aqueous electrolyte battery.

The electrode according to the present application is preferably provided with a porous polymer on the surface thereof Alternatively, the electrode according to the present application is preferably a porous electrode comprising pores formed between composite active materials, the pores being filled with a porous polymer. Still alternatively, the electrode according to the present application is preferably a porous electrode comprising pores formed between composite active materials having a porous polymer provided both in the pores and on the surface thereof.

The electrode according to the present application can be preferably produced by applying a mixture containing the foregoing composite active material of the present application or the composite active material produced by the process of the present application by coating to a collector.

The non-aqueous electrolyte battery of the present application comprises the composite active material of the present application, the composite active material produced by the process of the present application or the electrode of the present application.

In particular, the non-aqueous electrolyte battery of the present application preferably comprises a composite active material comprising a carbon-based active material provided with a polymer on the surface thereof in an amount of from 0.04% to 4% by weight as a negative active material. Alternatively, the non-aqueous electrolyte battery of the present application preferably comprises a composite active material comprising a positive active material provided with a polymer on the surface thereof in an amount from 0.01% to 5% by weight as a positive active material. Still alternatively, the non aqueous electrolyte battery of the present application preferably comprises both a composite active material comprising a carbon-based active material provided with a polymer on the surface thereof in an amount from 0.04% to 4% by weight as a negative active material and a composite active material comprising a Positive active material provided with a polymer on the surface thereof in an amount of from 0.01% to 5% by weight as a positive active material.

Further, the non-aqueous electrolyte battery of the present application preferably comprises a porous polymer as a separator to exhibit excellent performance.

BEST MODE FOR CARRYING OUT THE INVENTION

Figure 1:
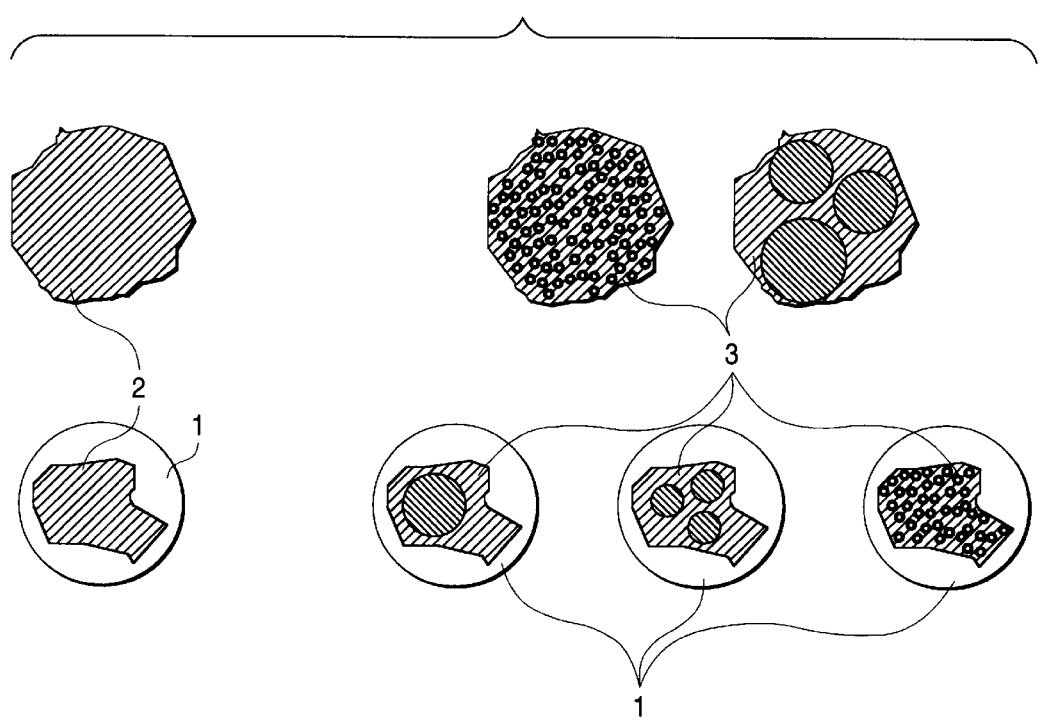
FIG. 1 is a schematic diagram illustrating an electrode comprising an active material coated with a porous polymer electrolyte.

The composite active material according to the present application is an active material provided with a polymer on the surface thereof. The content of the polymer is from 0.01% to 5% by weight.

In order that the composite active material can uniformly retain the electrolyte, it is necessary that the polymer be provided in an amount of 0.01% by weight or more. Further, in order to prevent the polymer from hindering the charge-discharge reaction or electronic conductivity of the positive electrode, it is necessary that the amount of the polymer provided on the active electrode material be 5% by weight or less.

This is presumably because the coating of the surface of the active material with too large amount of a polymer causes the polymer to hinder the charge-discharge reaction or impair the electronic conductivity of the electrode more than improving wettability while the coating of the surface of the active material with too small amount of a polymer makes it impossible to sufficiently retain the electrolyte.

In the non-aqueous electrolyte battery comprising a positive electrode which has the composite active material of the present application as a positive active material, the polymer provided on the positive active material can retain the electrolyte, making uniform current distribution in the positive electrode. Accordingly, the resulting battery exhibits improved high-rate discharge performance and safety performance. Further, since the electrolyte can hardly run short in the positive electrode, the battery exhibits good cyclability.

Referring to the positive active material provided with a polymer on the surface thereof, the polymer is preferably a porous polymer. The porous polymer has pores and thus allows lithium ions to rapidly diffuse through the electrolyte in the pores. Further, the porous polymer causes capillarity that makes it easy for the electrolyte to be retained by the polymer. Moreover, the porous polymer has a great specific surface area and thus can easily wet or swell with the electrolyte. Accordingly, the non-aqueous electrolyte battery comprising a composite active material having a positive active material provided with a porous polymer on the surface thereof exhibits improved cyclability and high-rate discharge performance as compared with the non-aqueous electrolyte battery comprising a positive active material provided with a non-porous polymer on the surface thereof.

Further, a non-aqueous electrolyte battery comprising a fluorine-containing polymer as the foregoing polymer or porous polymer exhibits good cyclability as compared with non-aqueous electrolyte battery comprising a composite active material provided with other kinds of polymer on the surface thereof because the fluorine-containing polymer is electrochemically stable on the positive electrode.

Referring to the composite active material of the present application, as the positive active material, particularly for non-aqueous electrolyte lithium secondary battery, there may be used any compound capable of lithium insertion and extraction. As an inorganic compound there may be used a composite oxide represented by the composition formula Li$_x$MO$_2$ or Li$_y$M$_2$O$_4$ (in which M is a transition metal, $0 \leq x \leq 1$, and $0 \leq y \leq 2$, oxide having tunnel-like voids, lamellar metal chalcogenide, oxyhydroxide or the like. Specific examples of these inorganic compounds include LiCoO$_2$, LiNiO$_2$, LiMn$_2$O$_4$, Li$_2$Mn$_2$O$_4$, MnO$_2$, FeO$_2$, V$_2$O$_5$, V$_6$O$_{13}$, TiO$_2$, TiS$_2$, and NiOOHLi. Among these inorganic compounds, LiCoO$_2$, LiNiO$_2$, LiMn$_2$C$_4$, and NiDOOHLi are particularly suitable for the present application. Alternatively, an inorganic compound comprising a transition metal M partially replaced by other elements may be used. Examples of such an inorganic compound include LiNi$_{0.00}$Co$_{0.20}$O$_2$, and LiNi$_{0.80}$Co$_{0.17}$Al$_{0.03}$O$_2$. The foregoing various active materials may be used in admixture regardless of which they are inorganic or organic. The shape of these active materials may be basically arbitrary such as fibrous and granular. The size of these active materials may be molecular level.

As the composite active material of the present application, if it is a negative active material particularly for non-aqueous electrolyte lithium secondary battery, there is preferably used a carbon-based active material such as particulate carbon, preferably that provided with a polymer on the surface thereof in an amount of from 0.04% to 4% by weight. The non-aqueous electrolyte battery comprising this composite active material as a negative active material is provided with a polymer in an amount of 0.04% by weight or more and thus allows the polymer provided in the negative active material to retain the electrolyte in a sufficient amount, giving a uniform current distribution in the negative electrode. Accordingly, the resulting battery exhibits improved high rate discharge performance and safety performance. Further, the exothermic reaction of the particulate carbon inserting lithium with the electrolyte can be inhibited and the irreversible capacity of the negative electrode can be decreased. Moreover, since the amount of the polymer is 4% by weight or less, the polymer doesn't hinder the charge-discharge reaction or electronic conductivity of the negative electrode.

The foregoing polymer is preferably a porous polymer. The porous polymer has pores and thus allows lithium ions to rapidly diffuse through the electrolyte in the pores. Further, the porous polymer causes capillarity that makes it easy for the electrolyte to be retained by the polymer. Moreover, the porous polymer has a great specific surface area and thus can easily wet or swell with the electrolyte. Accordingly, the non-aqueous electrolyte battery comprising a negative active material provided with a porous polymer on the surface thereof exhibits improved cyclability and high rate discharge performance as compared with the non-aqueous electrolyte battery comprising a negative active material provided with a non-porous polymer on the surface thereof.

Further, a non-aqueous electrolyte battery comprising a negative active material provided with a fluorine-containing polymer on the surface thereof as the foregoing polymer or porous polymer exhibits good cyclability as compared with non-aqueous electrolyte battery comprising a negative active electrode material provided with other kinds of polymer on the surface thereof because the fluorine-containing polymer is electrochemically stable on the negative electrode.

Examples of the carbon-based active material employable in the present application include carbon materials such as graphite and carbon. Examples of the carbon material include graphitizable carbon such as coke, mesocarbon microbeads (MCMB, mesophase pitch-based carbon fiber and pyrolytic vapor grown carbon fiber, non-graphitizable carbon such as sintered phenolic resin, polyacrylonitrile-based carbon fiber, pseudo-isotropic carbon and sintered furfuryl alcohol, graphite-based material such as natural graphite, artificial graphite, graphitized MCMB, graphitized mesophase pitch-based carbon fiber and graphite whisker, and mixture thereof. The shape of these active materials may be basically arbitrary such as fibrous and granular. The size of these active materials may be molecular level. In practice, however, these active materials are preferably granular.

The concept of the composite active material of the present application is shown in FIG. 1. In FIG. 1, the reference numeral 1 indicates an active material, the reference numeral 2 indicates a polymer, and the reference numeral 3 indicates a porous polymer.

In the present application, the content of the polymer provided on the surface of the active material can be defined by (weight of polymer/weight of composite active material)×100. In the case where the composite active material is formed only by a polymer and an active material, the weight of the composite active material is the sum of the weight of the polymer and the active material. The foregoing polymer content is not determined only for one piece of composite active material but is determined by averaging over pieces constituting an aggregate of composite active material. However, it is still preferred that each of composite active material satisfies the predetermined requirements for polymer content of the present application.

In the present invention, the content (% by weight) of the polymer provided on the surface of the active material can be determined, e.g., by the following method. A method may be employed which comprises dipping the active material provided with a polymer or the electrode comprising an active material provided with a polymer in the solvent for the polymer so that the polymer is extracted, and then measuring the weight of the polymer or the active material. Alternatively, a method involving differential scanning calorimeter (DSC) may be employed. Firefly, the active material provided with a polymer or the electrode comprising an active material provided with a polymer is subjected to DSC to determine the area Q1 of the melting peak of x g of the polymer. Subsequently, the area Q2 of the melting peak of A g of the polymer is determined. The weight of the polymer provided on the surface of the active material is given by the equation $X=(Q1/Q2)\times A$. The weight of the polymer as binder contained in the electrode comprising an active material provided with a polymer can be calculated in the same manner as mentioned above. Still alternatively, a method involving thermocravimety (TG) may be employed. Firefly, the active material provided with a polymer or the electrode comprising an active material provided with a polymer is subjected to TG to determine the weight change (dW1). Subsequently, a predetermined amount of the foregoing polymer and a predetermined amount of the foregoing active material are subjected to TG to determine their weight change (dW2, dW3). The weight of the polymer provided on the surface of the active material can be relatively calculated from dW1 and (dW2, dW3). The weight of the polymer as binder contained in the electrode comprising an active material provided with a polymer can be calculated in the same manner as mentioned above.

In the porous polymer of the present application, the polymer having pores or voids preferably wets or swells with the electrolyte so that lithium ions can move through the electrolyte in the pores of the polymer. More preferably, lithium ions can move in the polymer. Even more preferably, the porous polymer of the present application forms a network structure. The porous polymer of the present application preferably exhibits a porosity of from 40% to 90%, more preferably from 50% to 75%.

The electrode of the present application is prepared from the composite active material of the present application. In this arrangement, a polymer or porous polymer can be uniformly distributed in the electrode, making it possible to give a uniform current density and hence improve the cyclability high rate discharge performance and safety performance of the battery.

Further, since the electrode is provided with a porous polymer on the surface thereof to allow the electrode to come in close contact with the separator, the electrolyte doesn't run short in the gap between the separator and the electrode, providing remarkable improvement in the cyclability and high-rate discharge performance of the battery. On the other hand, when an electrode comprising an active material provided with no polymer on the surface thereof is provided with a porous polymer on the surface thereof, the electrolyte is absorbed by the porous polymer provided on the surface thereof, causing the electrolyte to run short around the active material inside the electrode. Accordingly, a non-aqueous electrolyte battery comprising such an electrode exhibits deteriorated cyclability and high-rate discharge performance as compared with the conventional batteries.

The electrode of the present application provided with a porous polymer on the surface thereof provides improvement in the cyclability and high-rate discharge performance of the battery for the same reason as mentioned above also when the porous polymer acts as a separator. Supposing that the thickness of the porous polymer provided on the surface of the positive electrode and the negative electrode and the separator are Tp, Tn and Ts, respectively, Tp, Tn and Ts preferably satisfy the relationship $5\ \mu m<(Tp+Tn+Ts)<50\ \mu m$, more preferably $(Tp+Tn+Ts)<25\ \mu m$.

Further, the porous electrode of the present application provided with a porous polymer in the pores that formed between composite active materials allows the porous polymer to retain the electrolyte not only in the polymer but also in the pores and thus provides a battery having a remarkably good cyclability. On the contrary, an electrode comprising an active material provided with no polymer on the surface thereof having a porous polymer in the pores thereof is liable to shortage of electrolyte in the micropores of the active material, making it difficult for the porous polymer electrolyte to be uniformly distributed in the electrode. The resulting battery exhibits deteriorated high-rate discharge performance as compared with the conventional batteries.

In the electrode of the present application, the weight of the porous polymer provided in the pores of the electrode excepting the porous polymer provided on the surface of the composite active material and the electrode preferably satisfies the following relationship of 0.1% by weight<(weight of porous polymer/weight of (composite active material+ electroconductive material+binder)×100% by weight<30% by weight.

The non-aqueous electrolyte battery of the present application comprising a porous polymer as a separator is not liable to shortage of electrolyte in the separator and thus exhibits good cyclability and high-rate discharge performance.

The polymer to be used in the present application acts as an electrolyte similarly to an electrolyte when assembled to battery. In caner words, in order to allow the polymer to act as an electrolyte, a polymer electrolyte may be used as the polymer. In order to allow the polymer to act similarly to an electrolyte, the polymer may be rendered porous or the like so that an electrolyte can be retained in the polymer to give a portion which acts as an electrolyte. The polymer electrolyte, if used, may be in the form of solvent-free polymer electrolyte or gel-like polymer electrolyte. The gel-like polymer electrolyte, if used, forms a polymer electrolyte only when impregnated with the electrolyte.

As the polymer material there is preferably used one which is flexible enough to change its shape according to the volume expansion and shrinkage of the active material due to charge and discharge process More preferably, a material can wet or swell with the electrolyte. The foregoing flexibility may be attained when the polymer is assembled to battery.

Specific examples of the polymer material employable herein include polyether such as polyethylene oxide and polypropylene oxide, polyolefin such as polyethylene and polypropylene, polyvinylidene fluoride (PVdF), polytetrafluoroethylene, polyvinyl fluoride, polyacrylonitrile, polyvinyl chloride, polyvinylidene chloride, polymethyl methacrylate, polymethyl acrylate, polyvinyl alcohol, polymethacrylonitrile, polyvinyl acetate, polyvinylpyrrolidone, polycarbonate, polyethylene terephthalate, polyhexamethylene adipamide, polycaprolactam, polyurethane, nolyethyleneimine, polybutadiene, polystyrene, polyisoprene carboxyrrethyl cellulose, methyl cellulose, and derivatives thereof. These polymer materials may be used singly or in admixture.

Alternatively, a polymer comprising various monomers constituting these polymers may be used. For example, vinylidene fluoride/hexafluoropropylene copolymer (P(VdF/HFP)), styrene butadiene rubber, etc. may be used.

In particular, a polyether such as polyethylene oxide and polypropylene oxide, polyacrylonitrile, polymethyl methacrylate, PVdF, F(VdF/HFP) and derivatives thereof are preferred. Further, a fluorine-containing polymer is most desirable. A fluorine-containing polymer such as PVdF and P(VdF/HFP) is electrochemically stable as compared with other polymer and thus can be used for all of positive electrode, negative electrode and separator, making it possible to give a uniform distribution of electrolyte in the battery and hence improve the cyclability and high-rate discharge performance of the battery.

The battery of the present application comprises an electrolyte incorporated therein in an amount of from 20% to 100% of the total volume of pores in the positive electrode, negative electrode and separator as compared with that of the conventional non-aqueous electrolyte battery, which is from 130% to 150%. In this arrangement, the amount of the electrolyte in the battery can be preferably reduced, making it possible to improve the safety performance of the battery. In order to prepare a battery having a better high-rate discharge performance, the amount of the electrolyte preferably is 40 or more of the total volume of pores in the positive electrode, negative electrode and separator.

Examples of the production process of the composite active material provided with a polymer on the surface thereof include a production process involving a step of dipping an active material in a solution, emulsion or suspension containing a polymer, a production process involving a step of mixing a powder containing a polymer and an active material, and a production process involving a step of spraying a solution, emulsion or suspension containing a polymer onto an active material. Particularly preferred among these production processes is the production process involving a step of dipping an active material in a solution containing a polymer. These steps are preferably followed by a step of filtering the mixture of a solution, emulsion or suspension containing a polymer and an active material. More preferably, this filtering step is followed by a step of drying the active material impregnated with the solution, emulsion or suspension containing a polymer. Further, by repeating the step such as dipping to the drying step, the content of the polymer electrolyte provided on the surface of the active material can be adjusted.

The active material may be in the form of powder or aggregate but is Preferably in the form of powder.

Since the surface of the active material is preferably coated uniformly with a polymer, it is necessary that the polymer solution be uniformly retained in the micropores of the active material particles and in the pores between the active material particles. For example, when the viscosity of the polymer solution is high, the polymer solution can hardly penetrate into the micropores of the active material particles and in the pores between the active material particles, making it impossible to coat the surface of the active material uniformly with the polymer. Therefore, in the production process of the positive active material and negative active material provided with a polymer electrolyte on the surface thereof, it is preferred that the viscosity of the solution, emulsion or suspension containing a polymer be properly adjusted to 20 mPa·s or less, more preferably 10 mPa·s or less, taking into account the concentration or temperature of the solution in use. The lower limit of the viscosity of the solution, emulsion or suspension containing a polymer is not specifically limited but is preferably as low as possible. In practice, however, the lower limit of the viscosity of the solution, emulsion or suspension containing a polymer is about 3 mP·s. In the present invention, a production process involving a step of dipping an active material in a polymer solution having a viscosity of 20 mPa·s or less, more preferably 10 mPa·s or less, is preferably used.

The production process of the present application preferably involves a step of placing the mixture of a polymer and an active material in a first pressure atmosphere and then in a second pressure atmosphere having a pressure greater than the first pressure atmosphere. In particular, the production process of the present application preferably involves a step of dipping an active material in a polymer solution in a first pressure atmosphere and then in a second pressure atmosphere having a pressure greater than the first pressure atmosphere to cause the foregoing polymer solution to be provided on the active material. For example, the production process of the present application preferably involves a step of dipping an active material in a polymer solution in an atmosphere having a pressure of 50 Torr or less, preferably 1 Torr or less, and then it returned to the atmospheric pressure.

Moreover, the production process of the present application preferably involves a step of heating a solution, emulsion or suspension containing a polymer and/or an active material to a temperature of from 30° C. to 200° C. or a step of stirring, vibrating or flowing a solution, emulsion or suspension containing a polymer and/or an active material.

Alternatively, the production process of the present application may involve a step of dipping an active material in a solution, emulsion or suspension containing a polymer and then phase-separating the polymer from those containing the polymer or a step of spraying a solution, emulsion or suspension containing a polymer onto an active material and then phase-separating the polymer from those containing the polymer in the present invention, however, it is particularly preferred that the production process involves a step of dipping an active material in a polymer solution and then phase-separating the polymer from the polymer solution. It is further preferred that the production process involves a step of dipping an active material in a polymer solution and then dipping the active material in a non-solvent for the polymer. The step of phase-separating the polymer from those containing the polymer is preferably preceded and/or followed by a step of filtering the mixture of a solution, emulsion or suspension containing a polymer and an active material. Further, the filtering step is preferably followed by a step of drying the active material impregnated with a solution, emulsion or suspension containing a polymer.

The active material may be in the form of powder or aggregate but is preferably in the form of powder. Further, by repeating the step such as dipping to the drying step, the content of the polymer electrolyte provided on the surface of the active material can be adjusted.

As the production process of a porous polymer involving the phase separation of a polymer from a solution b of the polymer in a solvent a there may be used a process involving the extraction of the solvent a from the solution b, the temperature change of the solution b by heating or cooling or the concentration change the solution b by evaporation. A particularly preferred production process involves the extraction of the solvent from the solution b, in other words, solvent extraction process. In the solvent extraction process, two solvents a and c are used. The solvent a is a solvent for dissolving a polymer. The solvent c is an extraction solvent for extracting the solvent a from the solution b. The solution b comprises the solvent a and the polymer. The solvent extraction process comprises dipping the solution b having a polymer dissolved therein in the solvent c incompatible with the polymer but compatible with the solvent a to extract the solvent a from the polymer solution b. In this manner, the portion from which the solvent a of the polymer has been removed forms a pore, making it possible to obtain a porous polymer.

In accordance with the solvent extraction process, pores which are circular at the opening thereof are formed in the polymer. The term "non-solvent for polymer" as used herein is meant to indicate the solvent c.

An example of the production process utilizing the temperature change of the solution b by heating or cooling will be described hereinafter. If a polymer which can difficultly be dissolved in the solvent d at a low temperature but can be dissolved in the solvent d at an elevated temperature and the solvent d are used in combination, the temperature is raised so that the polymer is dissolved in the solvent d. When the temperature of the solution e is then lowered, the polymer is supersaturated with respect to the solvent d, causing the polymer and the solvent d to be phase-separated from each other in the solution e. By removing the solvent d from the solution e in which the polymer an the solvent d have been phase-separated, a porous polymer can be obtained.

The polymer to be used in the production process of the present application is the same as used in the composite active material, electrode and non-aqueous electrolyte battery of the present application. As the solvent for the polymer to be used in the production process of the present invention there may be used a solvent capable of dissolving such a polymer therein.

Examples of the solvent employable herein include carbonic ester such as propylene carbonate, ethylene carbonate, dimethyl carbonate, diethyl carbonate and ethyl methyl carbonate, ether such as dimethyl ether, diethyl ether, ethyl methyl ether and tetrahydrofuran, ketone such as methyl ethyl ketone and acetone, dimethylformamide, dimethylacetamide, 1-methyl-pyrrolidinone, and N-methyl-2-pyrrolidone. Preferred as the solvent a for dissolving the polymer among these solvents are carbonic ester such as propylene carbonate, ethylene carbonate, dimethyl carbonate, diethyl carbonate and ethyl methyl carbonate, ether such as dimethyl ether, diethyl ether, ethyl methyl ether and tetrahydrofuran, dimethylformamide, dimethylacetamide, 1-methyl-pyrrolidinone, and N-methyl-2-pyrrolidone. Preferred as the solvent d for dissolving the polymer among these solvents are ketone such as methyl ethyl ketone and acetone, carbonic ester such as propylene carbonate, ethylene carbonate, dimethyl carbonate, diethyl carbonate and ethyl methyl carbonate, ether such as dimethyl ether, diethyl ether, ethyl methyl ether and tetrahydrofuran, and dimethylformamide. Particularly preferred among these solvents is ketone, especially methyl ethyl ketone.

In other words, when a specific polymer is used, as the solvent d there is preferably used a solvent d in which the polymer can be difficultly dissolved at a low temperature but can be easily dissolved at an elevated temperature. In some detail, ketone is preferred. In particular, methyl ethyl ketone is preferred. By dissolving the polymer in the solvent d at an elevated temperature, and then gradually lowering the temperature of the polymer solution, the polymer is supersaturated with respect to the solvent d, causing the polymer and the solvent d to be separated from each other in the polymer solution. By removing the solvent d from the solution in which the polymer and the solvent have been phase separated, a porous polymer can be obtained.

As the solvent c for extracting the solvent a from the polymer solution there may be used any solvent which is incompatible with the foregoing polymer but compatible with the solvent a. For example, water, alcohol, acetone, etc. may be used optionally in admixture.

In order to expedite the step of extracting the solvent a from the solution b, it is preferred that the temperature of the extraction solvent c be 30° C. or higher. It is also preferred that the temperature of the extraction solvent c be 5° C. or more lower than the melting point of the polymer. It is further preferred that the temperature of the extraction solvent c be 60°C. or lower. In order to expedite the step of extracting the solvent a from the solution b, it is preferred that the extraction solvent c be stirred, vibrated or flowed.

As another process for the production of the porous polymer electrolyte there may be used a production process which comprises making pores by irradiation with ultraviolet rays or the like.

The active material employable in the production process of the present application is the same as incorporated in the composite active material of the present application. The electrode, particularly for non-aqueous electrolyte battery, according to the present application is produced by the following process.

A production process involving a step of molding a mixture containing an active material or a production process involving a step of coating a mixture containing an active material to a current collector may be employed. A production process involving a step of coating a mixture containing a composite active material of the present application to a current collector is preferred.

The mixture containing an active material to be used in this step preferably comprises a binder incorporated therein. In some detail, polyether such as polyethylene oxide and polyoropylene oxide, polyolefin such as polyethylene and polypropylene, polyvinylidene fluoride (PVdF), polytetrafluoroethylene, polyvinyl fluoride, polyacrylonitrile, polyvinyl chloride, polyvinylidene chloride, polymethyl methacrylate, polymethyl acrylate, polyvinyl alcohol, polymethacrylonitrile, polyvinyl acetate, polyvinyl pyrrolidone, polycarbonate, polyethylene terephthalate, polyhexamethylene adipamide, polycaprolactam, polyurethane, polyethyleneimine, polybutadiene, polystyrene, polyisoprene, carboxymethyl cellulose, methyl cellulose, and derivatives thereof may be used singly or in admixture.

As the polymer there may be used one comprising various monomers constituting these polymers. In some detail, vinylidene fluoride/hexafluoropropylene copolymer (P(VdF/HFP)), styrene-butadiene rubber, etc. may be used. Preferred among these polymers are PVDF, P(VdF/HFP), polyethylene oxide, polypropylene oxide, polyvinyl alcohol, styrene-butadiene rubber, carboxymethyl cellulose, methyl cellulose, and derivatives thereof. The mixture containing an active material to be used in this step may comprise an electroconductive material incorporated therein. The mixture containing a positive active material preferably comprises an electroconductive material incorporated therein. Specific examples of the electroconductive material employable herein include carbon, acetylene black, and graphite.

Examples of the production process of the electrode provided with a porous polymer on the surface thereof for non-aqueous electrolyte battery comprising a composite active material of the present application will be given below. Examples of the process for applying a solution, emulsion or suspension containing a polymer to the surface of the electrode in a predetermined range of weight include a process which comprises applying a solution, emulsion or suspension containing a polymer to the surface of the electrode in an amount greater than the foregoing predetermined value, and then removing the excess solution, emulsion or suspension containing a polymer, and a process which comprises transferring a solution, emulsion or suspension containing a polymer in a predetermined range of weight to the electrode. These steps are preferably effected after pressing the electrode. Specific examples of these production processes include a production process which comprises pressing an electrode for non-aqueous electrolyte battery comprising a composite active material of the present application, dipping the electrode in a solution, emulsion or suspension containing a polymer, withdrawing the electrode, and then removing the solution, emulsion or suspension containing a polymer attached to the electrode from the surface of the electrode with a roller or blade to level the coated surface of the electrode, and a production process which comprises applying a solution, emulsion or suspension containing a polymer to a roll or plate in a predetermined range of weigh, and then transferring the solution, emulsion or suspension containing a polymer from the roll or plate to an electrode for non-aqueous electrolyte battery comprising a composite active material of the present application which has been pressed.

Examples of the production process for providing the electrode with a porous polymer electrolyte in the pores thereof for non-aqueous electrolyte battery comprising a composite active material of the present application will be given below. Examples of the process for retaining a solution, emulsion or suspension containing a polymer in the pores of the electrode include a production process involving a step of dipping an electrode for non-aqueous electrolyte battery comprising a composite active material of the present application in a solution, emulsion or suspension containing a polymer so that the solution, emulsion or suspension containing a polymer impregnates into the pores of the electrode, and a production process involving a step of applying a solution, emulsion or suspension containing a polymer to the surface of an electrode for non-aqueous electrolyte battery comprising a composite active material of the present application so that the solution, emulsion or suspension containing a polymer penetrates into the pores of the electrode by osmotic pressure. These steps may be followed by the phase separation of the polymer from the solution, emulsion or suspension containing a polymer in the pores of the electrode to form a porous polymer electrolyte in the pores of the electrode. The phase separation may be effected in the same manner as previously mentioned. In particular, a production process is preferred involving a step of dipping an electrode for non-aqueous electrolyte battery comprising a composite active material of the present application in a polymer solution and then phase-separating the polymer from the polymer solution. Alternatively, a production process is preferred involving a step of dipping an electrode for non-aqueous electrolyte battery comprising a composite active material of the present application in a polymer solution and then dipping the electrode in a non-solvent for the polymer.

Referring further to the production process for providing the electrode with a porous polymer electrolyte in the pores thereof for non-aqueous electrolyte battery comprising a composite active material of the present application, as the process for providing the electrode uniformly with a porous polymer electrolyte in the pores thereof there may be preferably used a process which comprises heating the solution, emulsion or suspension containing a polymer and/or the electrode to a temperature of from 30°C. to 200° C. More preferably, a method may be used which comprises heating the solution, emulsion or suspension containing a polymer and/or the electrode to a temperature of not higher than 60° C. Further preferred examples of the production process include a process which comprises placing an electrode retaining a solution, emulsion or suspension containing a polymer under reduced pressure condition, a process which comprises stirring or flowing a solution, emulsion or suspension containing a polymer, and a process which comprises vibrating a solution, emulsion or suspension containing a polymer and/or an electrode. The step of providing the electrode with a porous polymer electrolyte in the pores thereof is preferably effected before pressing the electrode. The excess solution, emulsion or suspension containing a polymer attached to the surface of the electrode is preferably removed by passing the electrode through rollers or the like.

As the solvent for the electrolyte there may be used a polar solvent such as ethylene carbonate, dimethyl carbonate, diethyl carbonate, ethyl methyl carbonate, γ-butyrolactone, sulfolan, dimethyl sulfoxide, acetonitrile, dimethylformamide, dimethyl acetamide, 1,2-dimethoxyethane, 1,2-diethoxyethane, tetrahydrofuran, 2-methyltetrahydrofuran, dioxolan and methyl acetate. These solvents may be used in admixture Examples of the salt to be contained in the solvent for electrolyte include a lithium salt such as $LiPF_6$, $LiBF_4$, $LiAsF_6$, $LiClO_4$, LiSCN, LiI, $LiCF_3SO_3$, LiCl, LiBr and $LiCF_3CO_2$. These salts may be used in admixture.

As the separator between the positive electrode and the negative electrode to be used in the prevention of short circuit there may be used a microporous membrane having pores or voids comprising polyolefin, such as polypropylene and polyethylene. These polyolefins may be used singly or in combination.

As the current collector for positive electrode and negative electrode there may be used any of iron, copper, aluminum, stainless steel, nickel, etc. The current collector may be in any form such as sheet, foamed material, sintered porous material and expanded grating. Such a current collector may be pierced with holes having an arbitrary shape.

EXAMPLE

Preferred examples of the present invention will be described hereinafter.

Example 1

At a first step, 7 solutions (P(VdF/HFP)/NMP solution) having different concentrations were prepared by dissolving vinylidene fluoride/hexafluoropropylene copolymer (P(VdF/HFP)) in N-methyl-2-pyrrolidone (NMP) The molar ratio of VdF to HFP in P(VdF/HFP) will be hereinafter 95:5 unless otherwise defined.

Subsequently, at a second step, a mixture of lithium cobaltate ($LiCoO_2$) and P(VdF/HFP) was prepared. In some detail, 1 kg of $LiCoO_2$ and 1.5 l of P(VdF/HFP)/NMP solution prepared at the first step were mixed. The mixture was heated to a temperature of 60° C. where it was then kept under a reduced pressure of 0.1 Torr for 30 minutes so that P(VdF/HFP)/NMP solution was retained in the voids between $LiCoO_2$ particles. The mixture of $LiCoO_2$ arid P(VdF/HFP)/NMP was withdrawn, subjected to filtration with suction to remove excess P(VdF/HFP)/NMP solution, dried at a temperature of 100° C. to remove NMP, and then vacuum-dried to obtain $LiCoO_2$/P(VdF/HFP) mixture. The weight fraction of P(VdF/HFP) in $LiCoO_2$/P(VdF/HFP) mixture thus obtained and sample number are set forth in Table 1.

In the present example, the weight fraction of P(VdF/HFP) contained in the active material was determined by the following method. In some detail, 100 g of $LiCoO_2$/P(VdF/HFP) mixture and 300 g of NMP were mixed and stirred. P(VdF/HFP)/NMP solution was then extracted. P(VdF/HFP) and $LiCoO_2$ were then separated from each other. Subsequently, $LiCoO_2$ was dried at a temperature of 100° C. The weight of $LiCoO_2$ was then measured to determine the weight fraction of P(VdF/HFP) contained in $LiCoO_2$/P(VdF/HFP) mixture. In the present example, the weight fraction of P(VdF/HFP) contained in the active material was determined in this manner unless otherwise defined.

TABLE 1

| Sample No. | P(VdF/HFP) concentration (wt-%) | P(VdF/HFP)/(positive active material + P(VdF/HFP)) (wt-%) |
|---|---|---|
| LC1 | 0.01 | 0.0048 |
| LC2 | 0.02 | 0.011 |
| LC3 | 0.2 | 0.12 |
| LC4 | 2.0 | 1.1 |
| LC51 | 10 | 4.8 |
| LC5 | 10 | 5.0 |
| LC6 | 12 | 6.3 |

At a third step, a graphitized MCMS/P(VdF/HFP) mixture was prepared. In some detail, 1 kg of graphitized MCMB (hereinafter simply referred to as "MCMS") and 1.5 l of P(VdF/HFP)/NMP solution prepared at the first step were mixed. The mixture was heated to a temperature of 60° C. where it was then kept under a reduced pressure of 0.1 Torr for 30 minutes so that P(VdF/HFP)/NMP solution was retained in the voids between MCMB particles. The fixture of MCMB and P(VdF/HFP)/NMP was withdrawn, subjected to filtration with suction to remove excess P(VdF/HFP)/NMP solution, dried at a temperature of 100° C. to remove NMP, and then vacuum-dried to obtain MCMS/P(VdF/HFP) mixture. The weight fraction of P(VdF/HFP) in MCMB/P(VdF/HFP) mixture thus obtained and sample number are set forth in Table 2.

TABLE 2

| Sample No. | P(VdF/HFP) concentration (wt-%) | P(VdF/HFP)/(negative active material + P(VdF/HFP)) (wt-%) |
|---|---|---|
| GR1 | 0.02 | 0.011 |
| GR2 | 0.08 | 0.041 |
| GR3 | 0.8 | 0.42 |
| GR4 | 2.0 | 1.1 |
| GR5 | 8 | 4.0 |
| GR6 | 10 | 4.9 |

Subsequently, at a fourth step, a $LiCo_2$/porous P(VdF/HFP) mixture was prepared. In some detail, 1 kg of $LiCoO_2$ and 1.5 l of P(VdF/HFP)/NMP solution prepared at the first step were mixed in the same manner as at the second step. The mixture was heated to a temperature of 60° C. where it was then kept under a reduced pressure of 0.1 Torr for 30 minutes so that P(VdF/HFP)/NMP solution was retained in the voids between $LiCoO_2$ particles. The mixture of $LiCoO_2$ and P(VdF/HFP)/NMP was withdrawn, and then subjected to filtration with suction to remove excess P(VdF/HFP)/NMP solution. Thereafter, according to the solvent extraction process, $LiCoO_2$/P(VdF/HFP)/NMP mixture was dipped in water for 10 minutes, dried at a temperature of 100° C. to remove water and NMP, and then vacuum-dried to obtain $LiCoO_2$/porous P(VdF/HFP) mixture. The results are set forth in Table 3.

TABLE 3

| Sample No. | P(VdF/HFP) concentration (wt-%) | P(VdF/HFP)/(positive active material + P(VdF/HFP)) (wt-%) |
|---|---|---|
| LCP1 | 0.01 | 0.0051 |
| LCP2 | 0.02 | 0.010 |
| LCP3 | 0.2 | 0.11 |
| LCP4 | 2.0 | 1.2 |
| LCP5 | 10 | 5.0 |
| LCP6 | 12 | 6.1 |

At a fifth step, an MCMB/porous P(VdF/HFP) mixture was prepared. In some detail, 1 kg of MCMB and 1.5 of P(VdF/HFP)/NMP solution prepared at the first step were mixed in the same manner as at the third step. The mixture was heated to a temperature of 60° C. where it was then kept under a reduced pressure of 0.1 Torr for 30 minutes so that P(VdF/HFP)/NMP solution was retained in the voids between MCMB particles. The mixture of MCMB and P(VdF/HFP)/NMP was withdrawn, and then subjected to filtration with suction to remove excess P(VdF/HFP)/NMP solution. Thereafter, according to the solvent extraction process, MCMB/P(VdF/HFP)/NMP mixture was dipped in water for 10 minutes, dried at a temperature of 100C to remove water and DNP, and then vacuum-dried to obtain MCMB/porous P(VdF/HFP) mixture. The results are set forth in Table 4.

TABLE 4

| Sample No. | P(VdF/HFP) concentration (wt-%) | P(VdF/HFP)/(negative active material + P(VdF/HFP)) (wt-%) |
|---|---|---|
| GRP1 | 0.02 | 0.009 |
| GRP2 | 0.08 | 0.041 |
| GRP3 | 0.8 | 0.39 |
| GRP4 | 2.0 | 1.2 |
| GRP5 | 8 | 4.0 |
| GRP6 | 10 | 5.0 |

10 samples were prepared for each of non-aqueous electrolyte batteries comprising active materials prepared at the foregoing second to fifth steps. Combinations of active a materials used in the batteries thus prepared are set forth in Table 5.

TABLE 5

| Battery No. | Positive electrode | Negative electrode | Battery No. | Positive electrode | Negative electrode |
|---|---|---|---|---|---|
| ST | LiCoO$_2$ | MCMB | — | — | |
| 1 | LC1 | MCMB | 13 | LCP1 | MCMB |
| 2 | LC2 | MCMB | 14 | LCP2 | MCMB |
| 3 | LC3 | MCMB | 15 | LCP3 | MCMB |
| 4 | LC4 | MCMB | 16 | LCP4 | MCMB |
| 5 | LC5 | MCMB | 17 | LCP5 | MCMB |
| 6 | LC6 | MCMB | 18 | LCP6 | MCMB |
| 7 | LC4 | GR1 | 19 | LCP4 | GRP1 |
| 8 | LC4 | GR2 | 20 | LCP4 | GRP2 |
| 9 | LC4 | GR3 | 21 | LCP4 | GRP3 |
| 10 | LC4 | GR4 | 22 | LCP4 | GRP4 |
| 11 | LC4 | GR5 | 23 | LCP4 | GRP5 |
| 12 | LC4 | GR6 | 24 | LCP4 | GRP6 |

The positive electrode provided with an active material layer on both sides thereof (a sixth step) was prepared by applying a paste obtained by mixing 70 wt-% of the positive material set forth in Table 5, 6 wt-% of acetylene black, 9 wt-% of PVdF and 15 wt-% of NMP to an aluminum foil having a width of 100 mm, a length of 480 mm and a thickness of 20 μM on both sides thereof, and then drying the coated material at a temperature of 150° C. to evaporate NMP. Thereafter, the positive electrode was pressed to reduce its thickness from 280 μm to 175 μm, and then cut into a size of 19 mm wide×480 mm long.

The negative electrode provided with an active material layer on both sides thereof (a seventh step) was prepared by applying a paste obtained by mixing 81 wt-% of the negative active material set forth in Table 5, 9 wt-% of PVdF and 10 wt-% of NMP to a copper foil having a width of 80 mm, a length of 500 mm and a thickness of 14 μm on both sides thereof, and then drying the coated material at a temperature of 150° C. to evaporate NMP. Thereafter, the negative electrode was pressed to reduce its thickness from 300 μm to 190 μm, and then cut into a size of 20 mm wide×500 mm long.

At an eighth step, the positive electrode and negative electrode thus prepared and a polyethylene separator having a thickness of 30 μm and a width of 22 mm were wound, and then inserted into a stainless steel case having a height of 47.0 mm, a width of 22.2 mm and a thickness of 6.4 mm. Into the case was then injected an electrolyte obtained by adding a 1 mol/l LIPF$_6$ to a 1:1 mixture (by volume) of ethylene carbonate and dimethyl carbonate to prepare a battery having a nominal capacity of 400 mAh. The battery case was provided with an irreversible safety valve.

Subsequently, cycle life tests of these batteries were performed. In some detail, at a temperature of 45° C., the battery was charged with a current of 400 mA to 4.1 V, and then charged at a constant voltage of 4.1 V for 2 hours. The battery was then discharged with a current of 400 mA to 2.75 V. This procedure was repeated 500 times. The ratio of discharge capacity at 500th cycle to discharge capacity at 1st cycle is defined to be "retention of discharge capacity". The relationship between the amount of electrolyte and the retention of discharge capacity is shown in Table 6 and FIGS. 2 to 5. Table 6 shows the relationship between the amount of electrolyte and the retention of discharge capacity of the known conventional battery (battery ST). FIGS. 2, 3, 4 and 5 show the relationship between the amount of electrolyte and the retention of discharge capacity of Battery Nos. 1 to 6, 7 to 12, 13 to 18 and 19 to 24, respectively.

TABLE 6

| % Amount of electrolyte | 120 | 100 | 60 | 20 | 10 |
|---|---|---|---|---|---|
| % Retention of discharge capacity after 500 cycles | 13 | 12 | 7 | 4 | 2 |

Figure 2:
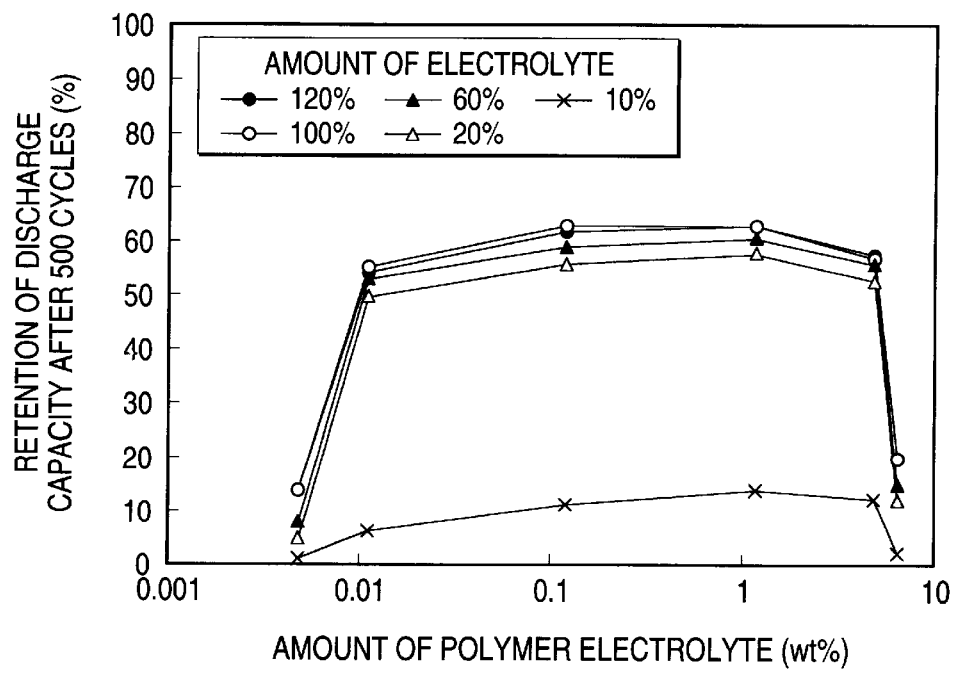
FIG. 2 is a crash illustrating the relationship between the retention of discharge capacity after 500 cycles and the amount of electrolyte of Battery Nos. 1 to 6.

As can be seen in FIG. 2, Battery Nos. 2 to 5 of the invention comprising a polymer in an amount of from 0.01 to 5% by weight provided on the surface of LiCoO$_2$ particles exhibit drastically improved cyclability as compared with the conventional known Battery No. ST. This is presumably because when the positive active material is provided with a polymer which can easily swell with the electrolyte, the resulting positive electrode exhibits an enhanced retention of electrolyte that gives drastic improvement in the cyclability of the battery.

The reason why Battery No. 1 leaves something to be desired in cyclability is presumably that the positive active material is not provided with a polymer in a sufficient amount, making it impossible for the resulting positive electrode to exhibit an enhanced retention of electrolyte.

The reason why Battery No. 6 leaves something to be desired in cyclability is presumably that the positive active material is provided with a polymer in an excessive amount, hindering charge-discharge reaction on the surface of the positive active material. It was also made obvious that the optimum amount of electrolyte in Battery Nos. 2 to 5 of the invention is 20% or more.

Figure 3:
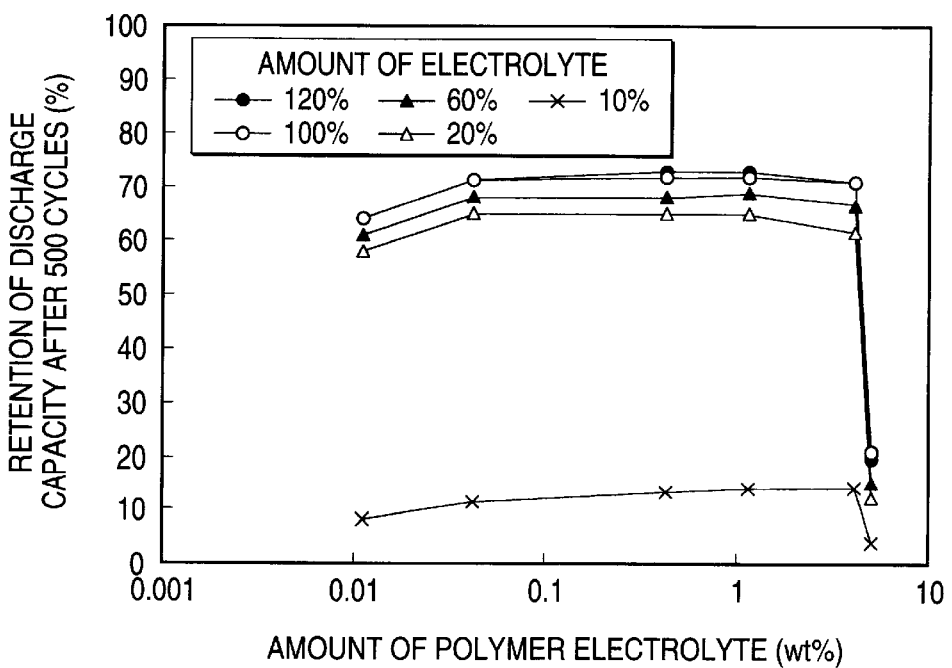
FIG. 3 is a graph illustrating the relationship between the retention of discharge capacity after 500 cycles and the amount of electrolyte of Battery Nos. 7 to 12.

As can be seen in FIG. 3, Battery Nos. 8 to 11 of the invention provided with a polymer on the surface of $LiCoO_2$ and provided with a polymer on the surface of graphite in an amount of from 0.04 to 4% by weight exhibit further enhancement of retention of discharge capacity as compared with Battery No. 4, which exhibits the best cyclability among Battery Nos. 2 to 5.

This is presumably because the negative active material, too, is provided with a polymer which can easily swell with the electrolyte, making it possible for the negative electrode to retain more the electrolyte and hence improve the cyclability of the battery.

The reason why Battery No. 7 leaves something to be desired in cyclability is presumably that the negative active material is not provided with a polymer in a sufficient amount, making it impossible for the resulting negative electrode to exhibit an enhanced retention of electrolyte. The reason why Battery No. 12 leaves something to be desired in cyclability is presumably that the negative active material is provided with a polymer in an excessive amount, hindering charge-discharge reaction on the surface of the negative active material. Battery No. 12 was then disassembled after the cycle life test. As a result, dendritic lithium deposited on the surface of the negative electrode was observed. It was also made obvious that the optimum amount of electrolyte in Battery Nos. 8 to 11 of the invention is 20% or more.

Figure 4:
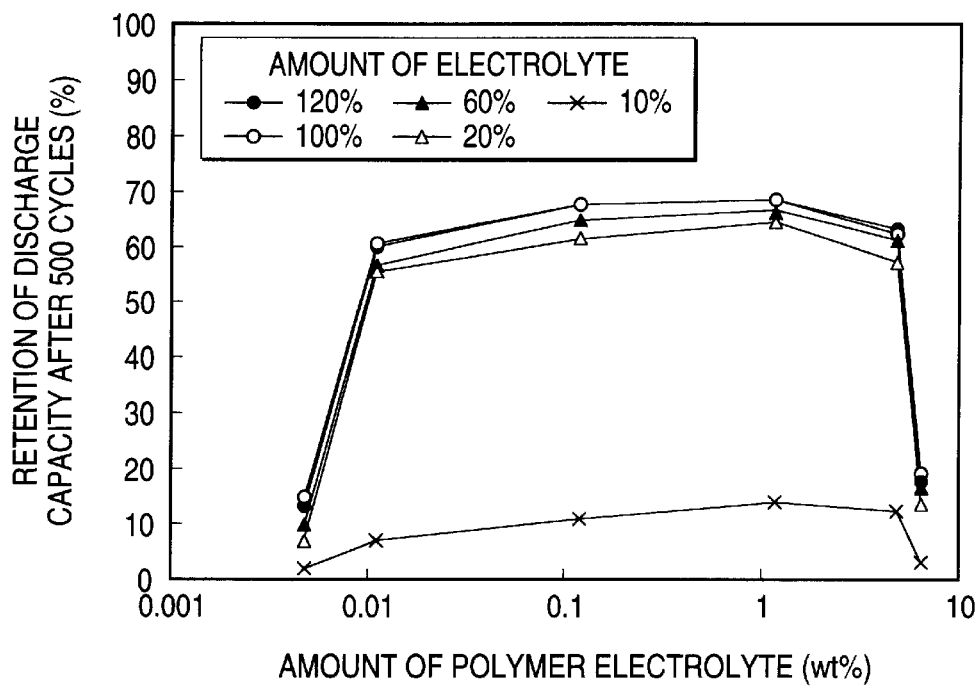
FIG. 4 is a graph illustrating the relationship between the retention of discharge capacity after 500 cycles and the amount of electrolyte of Battery Nos. 13 to 18.

As can be seen in FIG. 4, Battery Nos. 14 to 17 of the invention provided with a porous polymer on the surface of $LiCoO_2$ in an amount of from 0.01 to 5% by weight exhibit further enhancement of cyclability as compared with Battery Nos. 2 to 5 of the invention provided with a polymer on the surface of $LiCoO_2$ in an amount of from 0.01 to 5% by weight.

This is presumably because the porous polymer can easily retain the electrolyte in its pores by capillarity and has a great specific surface area and hence a great contact area with the electrolyte that facilitates swelling with the electrolyte. Accordingly, the resulting positive electrode exhibits further enhancement of retention of electrolyte that improves the cyclability of the battery.

The reason why Battery No. 13 leaves something to be desired in cyclability is presumably that the positive active material is not provided with a polymer in a sufficient amount, making it impossible for the resulting positive electrode to exhibit an enhanced retention of electrolyte.

The reason why Battery No. 18 leaves something to be desired in cyclability is presumably that the positive active material is provided with a polymer in an excessive amount, hindering charge-discharge reaction on the surface of the positive active material. It was also made obvious that the optimum amount of electrolyte in Battery Nos. 14 to 17 of the invention is 20% or more.

Figure 5:
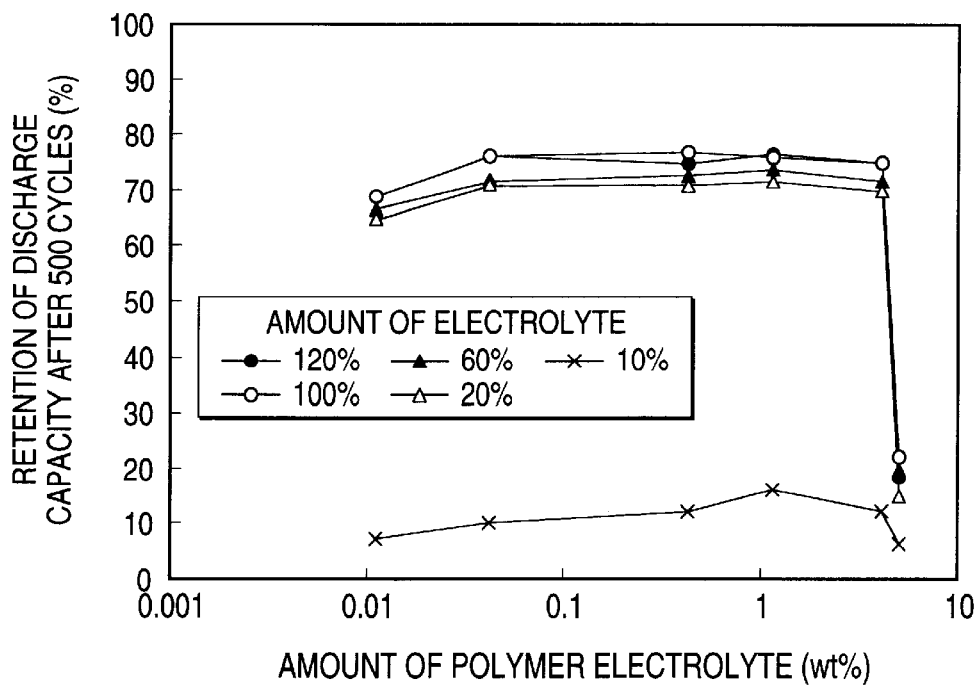
FIG. 5 is a graph illustrating the relationship between the retention of discharge capacity after 500 cycles and the amount of electrolyte of Battery Nos. 19 to 24.

As can be seen in FIG. 5, Battery Nos. 20 to 23 of the invention provided with a porous polymer on the surface of $LiCoO_2$ and provided with a porous polymer on the surface of graphite in an amount of from 0.04 to 4% by weight exhibit further enhancement of retention of discharge capacity as compared with Battery No. 16, which exhibits the best cyclability among Battery Nos. 14 to 17.

This is presumably because the negative active material, too, is provided with a porous polymer which can easily swell with the electrolyte, making it possible for the negative electrode to retain more the electrolyte and hence improve the cyclability of the battery.

The reason why Battery No. 19 leaves something to be desired in cyclability is presumably that the negative active material is not provided with a porous polymer in a sufficient amount, making it impossible for the resulting negative electrode to exhibit an enhanced retention of electrolyte.

The reason why Battery No. 24 leaves something to be desired in cyclability is presumably that the negative active material is provided with a porous polymer in an excessive amount, hindering charge-discharge reaction on the surface of the negative active material.

Battery No. 24 was then disassembled after the cycle life test. As a result, dendritic lithium deposited on the surface of the negative electrode was observed. It was also made obvious that the optimum amount of electrolyte in Battery Nos. 20 to 23 of the invention is 20% or more.

Further, the batteries comprising LC4 as a positive active material and GRP2 to 5 as a negative active material exhibit enhancement of cyclability as compared with the batteries comprising GR2 to 5 as a negative active material.

Positive and negative electrode were then prepared with LCP4 as a positive active material and GRP4 as a negative active material, respectively, in the same manner as used at the sixth and seventh steps.

Subsequently, at a ninth step, these electrodes were dipped in a polymer solution obtained by dissolving 20 wt-% of P(VdF/HFP) in NMP so that the polymer solution was provided on the surface thereof. Subsequently, these electrodes were each passed through the gap between rollers to adjust the thickness of the polymer solution provided on the surface thereof to 4 $\mu$m.

Subsequently, these electrodes were each dipped in deionized water so that NMP was extracted to form a porous polymer on the surface thereof. The thickness of the porous polymer formed on the surface of the electrode was 1 $\mu$m. In this manner, a positive electrode PS and a negative electrode NS were prepared.

Subsequently, batteries comprising electrodes shown in Table 7 in combination were prepared in the same manner as used at the eighth step.

TABLE 7

| Battery No. | Positive electrode | Negative electrode |
|---|---|---|
| 25 | PS | — |
| 26 | — | NS |
| 27 | PS | NS |

Battery Nos. 25 to 27 provided with a porous polymer electrolyte on the surface or at least one of the positive electrode and the negative electrode and Battery No. 22 of which neither surface of the positive and negative electrodes were with a porous polymer electrolyte were each then subjected to cycle life test in the same manner as mentioned above.

Figure 6:
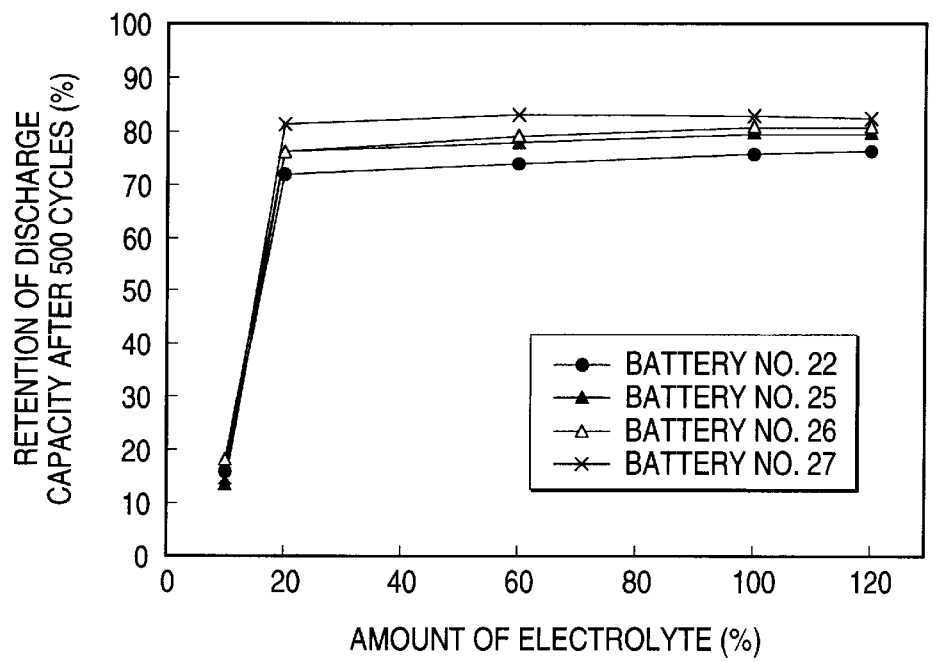
FIG. 6 is a graph illustrating the relationship between the retention of discharge capacity after 500 cycles and the amount of electrolyte of Battery Nos. 25 to 27.

The results are set forth in FIG. 6. It was made obvious that exhibit further improvements of cyclability can be provided as compared with Battery No. 22 merely by providing a porous polymer electrolyte on the surface of the positive electrode or negative electrode alone. It was also made obvious that by providing a porous polymer electrolyte on the surface of both the positive and negative electrodes, further improvement of cyclability can be provided as compared with Battery Nos. 25 and 26.

This is presumably because the separator and the electrodes can come in closer contact with each other, making it possible to prevent the shortage of electrolyte in the gap therebetween and hence improve the cyclability of the battery. It was also made obvious that the optimum amount of electrolyte in Battery Nos. 25 and 26 of the invention is 20% or more.

Subsequently, an electrode comprising LCP4 as a positive active material was dipped in a polymer solution obtained by dissolving 8 wt-% of P(VdF/HFP) in NMP so that the polymer solution was provided in the pores of the electrode before being pressed at the sixth step. The electrode was then passed through the gap between rollers to remove excess polymer solution from the surface of the electrode. The electrode was then dipped in deionized water so that NMP was extracted to form a porous polymer electrolyte in the pores of the electrode. Thereafter, the electrode was pressed to reduce its thickness from 280 $\mu$m to 175 $\mu$m, and then cut into a size of 19 mm wide×480 mm long. In this manner, a positive electrode PP was prepared.

Subsecuently, an electrode comprising GRP4 as a negative active material was dipped in a polymer solution obtained by dissolving 6 wt-% of P(VdF/HFP) in NMP so that the polymer solution was provided in the pores of the electrode before being pressed at the seventh step. The electrode was then passed through the gap between rollers to remove excess polymer solution from the surface of the electrode. The electrode was then dipped in deionized water so that NMP was extracted to form a porous polymer electrolyte in the pores or the electrode. Thereafter, the electrode was pressed to reduce its thickness from 300 $\mu$m to 190 $\mu$, and then cut into a size of 20 mm wide×500 mm long. In this manner, a negative electrode NP was prepared.

Further, the positive electrode PP and the negative electrode NP were processed at the ninth step to prepare a positive electrode PPS and a negative electrode NPS provided with a porous polymer electrolyte to a thickness of 1 $\mu$m on the surface thereof, respectively.

Subsequently, batteries comprising electrodes shown in Table 8 in combination were prepared in the same manner as used at the eighth step. Further, batteries were prepared in the same manner as used at the eighth step except that the polyethylene separator was replaced by a porous P(VdF/HFP) membrane (porosity: 55%) having a thickness of 32 $\mu$m and a width of 22 mm.

TABLE 8

| Battery No. | Positive electrode | Negative electrode | Separator |
|---|---|---|---|
| 28 | PPS | — | Polyethylene |
| 29 | — | NPS | Polyethylene |
| 30 | PPS | NPS | Polyethylene |
| 31 | PPS | NPS | P(VdF/HFP) |

Figure 7:
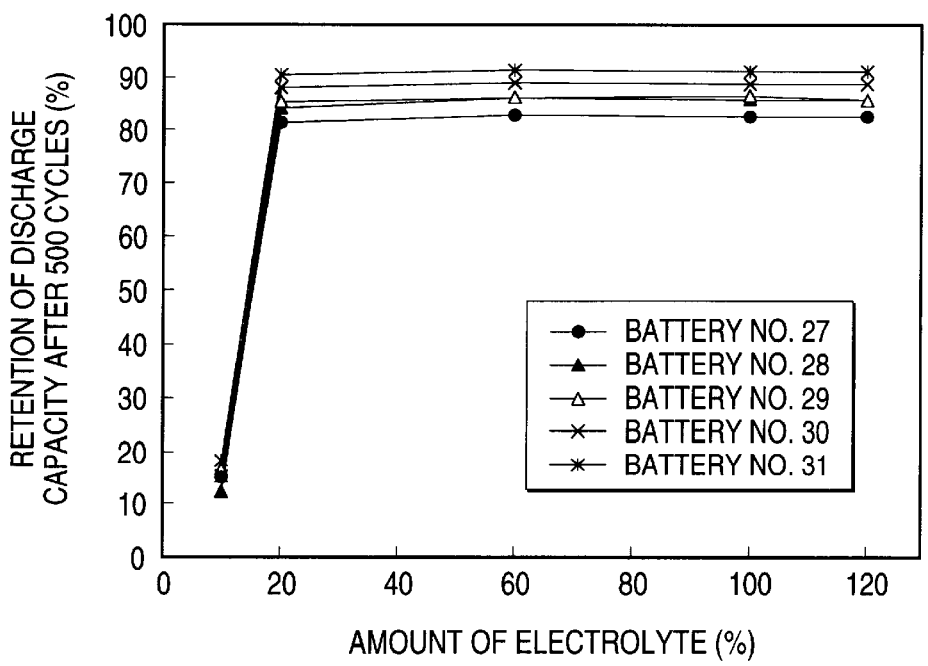
FIG. 7 is a graph illustrating the relationship between the retention of discharge capacity after 500 cycles and the amount of electrolyte of Battery Nos. 28 to 31.

Battery Nos. 28 to 31 provided with a porous polymer electrolyte in the pores of at least one of the positive electrode and the negative electrode and Battery No. 27 of which pores of the positive and negative electrodes were not provided with porous polymer electrolyte were each then subjected to cycle life test in the same manner as mentioned above. The results are set forth in FIG. 7.

It was made obvious that further improvement of cyclability was provided as compared with Battery No. 27 merely by providing a porous polymer electrolyte in the pores of the positive electrode or negative electrode alone. It was also made obvious that by providing a porous polymer electrolyte in the pores of both the positive and negative electrodes, further are improvement of cyclability can be provided as compared with Battery Nos. 28 and 29. This is presumably because the positive or negative electrode is provided with a porous polymer electrolyte in its pores, making it possible for the positive or negative electrode to retain more the electrolyte and hence improve the cyclability of the battery.

Further, Battery No. 31 comprising a porous polymer electrolyte inserted into the gap between the positive and negative electrodes instead of separator exhibits further improvement of cyclability. This is presumably because the use of a porous polymer electrolyte in the separator portion makes it possible to prevent the shortage of electrolyte in the separator portion.

It was also made obvious that the optimum amount of electrolyte in Battery Nos. 28 to 31 of the invention is 20% or more.

At the ninth step, the positive electrode PP and the negative electrode NP were passed through the gap between rollers so that the thickness of the polymer solution provided on the surface thereof was from 60 $\mu$m to 100 $\mu$m. These electrodes were each dipped in deionized water so that NMP was extracted to form a porous polymer electrolyte on the surface thereof. The thickness of the porous polymer electrolyte formed on the surface of the positive electrode and the negative electrode were 15 $\mu$m and 30 $\mu$m, respectively. In this manner, positive and negative electrodes shown in Table 9 were prepared.

TABLE 9

| Positive electrode | Negative electrode | Thickness of porous polymer electrolyte ($\mu$m) |
|---|---|---|
| PPS1 | NPS1 | 15 |
| PPS2 | NPS2 | 30 |

The electrodes shown in Table 9 were then combined as shown in Table 10 to prepare batteries. In the preparation of these batteries, no polyethylene separator was used at the eighth step.

TABLE 10

| Battery No. | Positive electrode | Negative electrode |
|---|---|---|
| 32 | PPS1 | NPS1 |
| 33 | PPS2 | — |
| 34 | — | NPS2 |

It was made obvious that Battery Nos. 32 to 34 exhibit the same cyclability as Battery No. 31.

Example 2

The foregoing Battery Nos. ST and 1 to 34 were further prepared for safety performance test. In some detail, at room temperature, the battery was charged with a current of 400 mA to 4.5 V, charged at a constant voltage of 4.5 V for 2 hours, and then externally short-circuited. The results are set forth in Table 11.

TABLE 11

| | Amount of electrolyte (%) | | |
|---|---|---|---|
| Battery No | 10, 20 | 60, 100 | 120 |
| ST | No troubles | Smoking | Smoking/Firing |
| 1,6,12,13,18,24 | No troubles | Smoking | Smoking/Firing |
| Batteries other than above | No troubles | No troubles | Smoking |

The foregoing results show that the battery of the invention can be rendered more safe when the amount of electrolyte is 100% or less.

Example 3

At a tenth sleep, solutions (P(VdF/HFP)/NMP solution) were prepared by dissolving P(VdF/HFP)/NMP. The various solutions were each measured for viscosity. The results are set forth in Table 12.

TABLE 12

| P(VdF/HFP)/NMP solution No. | P(VdF/HFP) concentration (wt-%) | Viscosity mPa · s |
|---|---|---|
| S1 | 0.1 | 2.1 |
| S2 | 0.5 | 3.8 |
| S3 | 1.0 | 6.4 |
| S4 | 2.0 | 11.5 |
| S5 | 3.0 | 18.1 |
| S6 | 4.0 | 22.5 |
| S7 | 6.0 | 45.3 |

Subsequently, at an eleventh step, an MCMB/P(VdF/HFP) mixture was prepared. In some detail, 100 g of MCMB and 150 ml of P(VdF/HFP)/NMP solution S3 (1.0 wt-%) prepared at the tenth step were mixed. The mixture was kept under a reduced pressure of 0.1 Torr for 30 minutes so that P(VdF/HFP)/NMP solution was retained in the voids between MCMB particles. The mixture of MCMB and P(VdF/HFP)/NMP solution was withdrawn, subjected to filtration with suction to remove excess P(VdF/HFP)/NMP solution, dried at a temperature of 100° C. to remove NMP, and then vacuum-dried to obtain MCMB/P(VdF/HFP) mixture (hereinafter referred to as "a1").

Subsequently, this procedure was repeated twice to five times to prepare MCMB/P(VdF/HFP) mixtures having a great P(VdF/HFP) content. MCMB/P(VdF/HFP) mixture obtained by repeating this procedure twice was designated as a2. MCMB/P(VdF/HFP) mixture obtained by repeating this procedure three times was designated as a3. Thus, MCMB/P(VdF/HFP) mixtures a2 to a5 were obtained.

Figure 9:
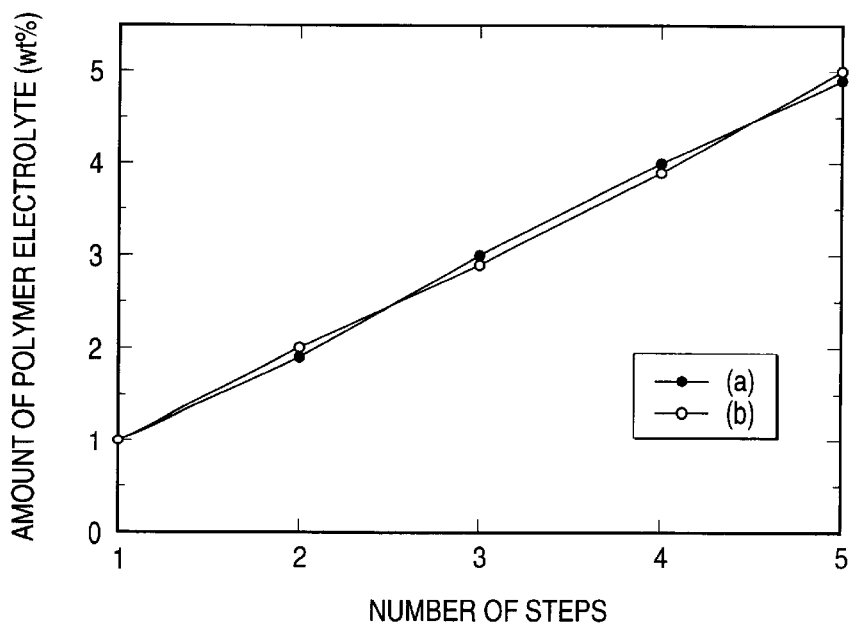
FIG 9 illustrates the relationship between the number of steps and the polymer content in MCMB/P(VdF/HFP) mixture (a1 to a5) and MCMB/porous P(VdF/HFP) mixture (b1 to b5).

The relationship between the number of steps and P(VdF/HFP) content is shown in FIG. 9. As can be seen in FIG. 9, P(VdF/HFP) content is substantially proportional to the number of steps.

At a twelfth step, an MCMB/porous P(VdF/HFP) mixture was prepared. In some detail, 100 g of MCMB and 150 ml of P(VdF/HFP)/NMP solution S3 (1.0 wt-%) prepared at the first step were mixed in the same manner as used at the eleventh step. The mixture was kept under a reduced pressure of 0.1 Torr for 30 minutes so that P(VdF/HFP)/NMP solution was retained in the voids between MCMB particles. The mixture of MCMB and P(VdF/HFP)/NMP was withdrawn, and then subjected to filtration with suction to remove excess P(VdF/HFP)/NMP solution. Thereafter, according to the solvent extraction process, MCMB/P(VdF/HFP)/NMP mixture was dipped in water for 10 minutes, dried at a temperature of 100° C. to remove water and NMP, and then vacuum-dried to obtain MCMB/porous P(VdF/HFP) mixture (hereinafter referred to as "b1").

Subsequently, this procedure was repeated twice to five times to prepare MCMB/porous P(VdF/HFP) mixtures having a great P(VdF/HFP) content. MCMB/P(VdF/HFP) mixture obtained by repeating this procedure twice was designated as b2. MCMB/P(VdF/HFP) mixture obtained by repeating this procedure three times was designated as b3. Thus, MCMB/P(VdF/HFP) mixtures b2 to b5 were obtained.

The relationship between the number of steps and P(VdF/HFP) content was almost the same as shown in FIG. 9.

At a thirteenth step, MCMB/P(VdF/HFP) mixtures (a1 to a5) prepared at the eleventh step, MCMB/porous P(VdF/HFP) mixtures (b1 to b5) prepared at the twelfth step and untreated MCMB (designated as "c") as an active material were used to prepare a negative electrode having a size of 20 mm×15 mm. A paste obtained by mixing the foregoing active material, PVdF and NMP at a ratio of 81:9:10 (wt-%) was then applied to a foamed nickel substrate, and then dried at a temperature of 100° C. to evaporate NMP. The negative electrode was then pressed to a thickness of 200 μm.

The negative electrode thus prepared and metallic lithium electrodes as a reference electrode and an counter electrode were then assembled in a glass cell for testing negative electrode. As the electrolyte there was used one obtained by adding a 1 mol/l LiClO$_4$ to a 1:1 (by volume) mixture of ethylene carbonate and dimethyl carbonate.

Using this glass cell, charge discharge test was performed. In some detail, 1st cycle charging was carried out with a constant current of 0.2 CmA to 0 V and then at a constant voltage of 0 V for 10 hours in total. Subsequently, 1st cycle discharging was carried out with a constant current of 0.2 CmA to 1.5 V. Under the same conditions as above, charge and discharge at 2nd cycle three carried out. Subsequently, 3rd cycle charging was carried out with a constant current of 0.2 CmA until the composition of the active material reached a condition of Li$_{0.7}$C$_6$.

Figure 8:
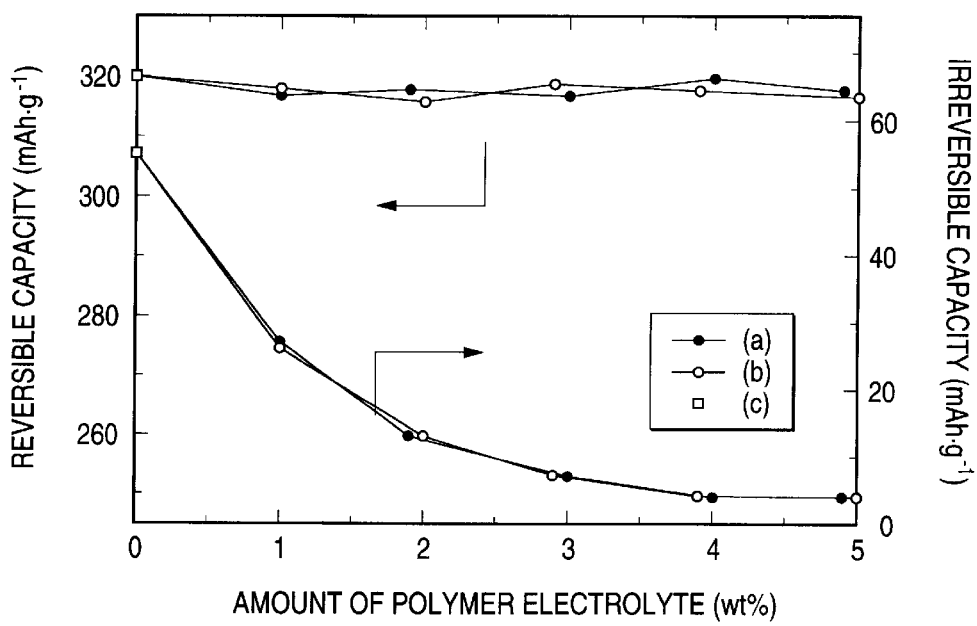
FIG. 8 illustrates the relationship between the content of P(VdF/HFP) and the reversible capacity and irreversible capacity of MCMB/P(VdF/HFP) mixture (a1 to a5), MCMB/porous P(VdF/HFP) mixture (b1 to b5) and untreated MCMB(c).

The relationship between the reversible capacity and the irreversible capacity of MCMB/P(VdF/HFP) mixtures a1 to a5, b1 to b5 and untreated MCMB (c) is shown in FIG. 8. The term "reversible capacity" as used herein is meant to indicate the discharge capacity averaged over 1st and second cycles. The term "irreversible capacity" as used herein is meant to indicate the difference between the charge capacity and the discharge capacity at first cycle.

As can be seen in FIG. 8, there is little difference in reversible capacity between MCMB/P(VdF/HFP) mixtures a1 to a5 and b1 to b5 of the invention and untreated MCMB (c). However, MCMB/P(VdF/HFP) mixtures a1 to a5 and b1 to b5 show a drastic decrease in irreversible capacity compared with untreated MCMB (c). The irreversible capacity of MCMB/P(VdF/HFP) mixtures a4 and b4, which have a P(VdF/HFP) content of 4 wt-%, is 10% or less of that of untreated MCMB (c).

This is because when MCMB and P(VdF/HFP) are mixed to coat the surface of MCMB with P(VdF/HFP, irreversible reaction, i.e., decomposition of the solvent in electrolyte on the surface of MCMB and accompanying formation of a film on the surface of MCMB can be inhibited.

The performance of inhibiting the decomposition of the solvent in electrolyte on the surface of MCMB by coating the surface of MCMB with P(VdF/HFP) can be effectively exerted also when carbon materials other than MCMB or polymers other than P(VdF/HFP) are used. However, a fluorine-containing polymer is particularly preferred.

Even when the content of P(VdF/HFP) in MCMB/P(VdF/HFP) is 4 wt-% or more, the irreversible capacity of the active material mixtures a1 to a5 and b1 to b5 remains almost constant and the content of P(VdF/HFP) in MCMB/P(VdF/HFP) merely increases. Thus, it is necessary that the content of P(VdF/HFP) be 4 wt-% or less.

Figure 10:
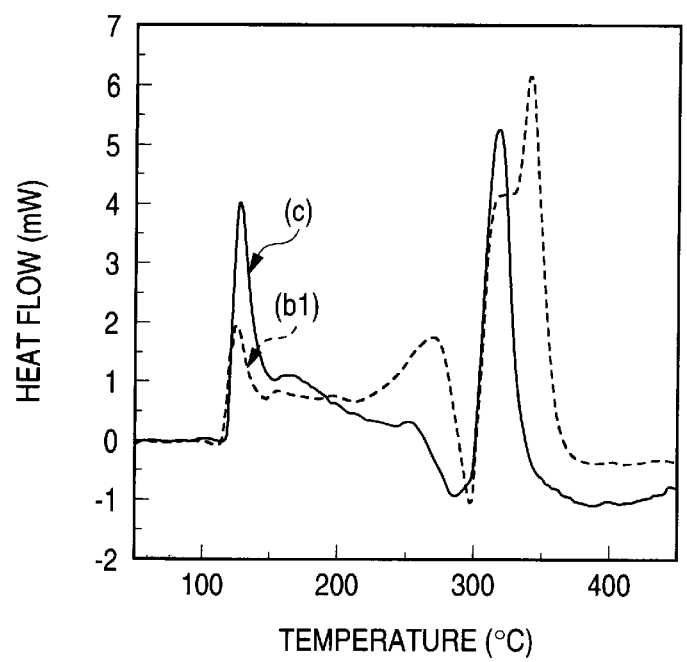
FIG. 10 is DSC curves of MCMB/porous P(VdF/HFP) mixture (b1) and untreated MCMB(c).

The thermal stability of MCMB/P(VdF/HFP) mixtures a1 to a5 and b1 to b5 in charged state at 3rd cycle (in the state of $Li_{0.7}C_6$) was then measured. 1.5 mg of each of MCMB/P(VdF/HFP) mixtures a1 to a5 and b1 to b5 in charged state after the 3rd cycle charging and 1.2 mg of an electrolyte (1:1 (by volume) mixture of ethylene carbonate and dimethyl carbonate+1 mol/l $LiPF_4$) were encapsulated in an SUS container, and then subjected to measure differential scanning calorimetry (DSC). By way of example, DSC curves of MCMB/porous P(VdF/HFP) mixture (b1) and untreated MCMB (c) are shown in FIG. 10. The exothermic peaks observed on DSC curve of untreated MCMB (c) are considered to be attributed to the following reaction (J. Electrochem. Soc., 145 (1998) 472). The exothermic peak at around 120° C. is considered to be attributed to the decomposition of passivation film on the surface of graphite. The exothermic peak at around 250° C. is considered to be attributed to the reaction of $Li_{x6}$, with the electrolyte. The exothermic peak at around 320° C. is considered to be attributed to the react-on of $Li_xC_6$ with PVdF as a binder. On the contrary, DSC curve of MCMB/porous P(VdF/HFP) mixture (b1) shows that heat quantity at around 120° C. is reduced to not more than half the conventional value. The heat generation at around 120° C. causes thermal runaway in the positive electrode that greatly affects the safety performance of the battery. Accordingly, batteries comprising MCMB/porous P(VdF/HFP) mixture (b1) used as a negative electrode are considered to have remarkably enhanced safety performance. MCMB/porous P(VdF/HFP) mixture (b1) was observed to have an increase in heat quantity at around 250° C. and a new exothermic peak at around 350° C. The new exothermic peak observed at around 350° C. is considered to be attributed to the reaction of P(VdF/HFP) coated on the surface of MCMB with $Li_xC_6$ (J. Electrochem. Soc., 145 (1998) 472). DSC curve of MCMB/P(VdF/HFP) mixture (a1) was almost the same as that of MCMB/porous P(VdF/HFP) mixture (b1). The reason why the foregoing definite exothermic peak is given merely by dipping MCMB in 1 wt-% of P(VdF/HFP) solution so that the surface of MCMB is coated with a small amount of P(VdF/HFP) is considered that P(VdF/HFP) solution used to prepare the active material has a viscosity low enough to coat uniformly MCMB not only on the surface thereof but also in the micropores thereof.

Figure 11:
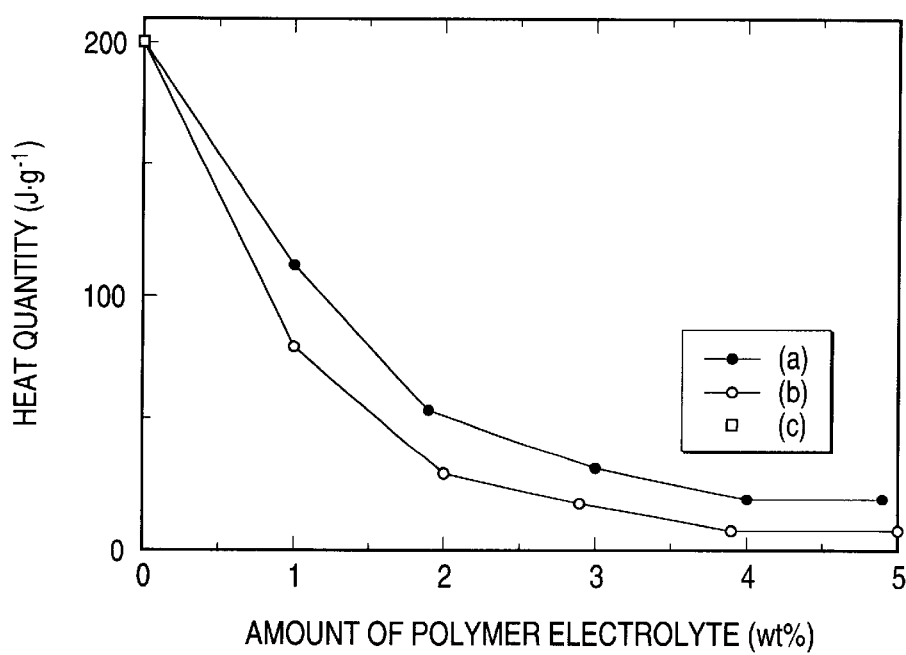
FIG. 11 illustrates the relationship between the continent of polymer electrolyte and the heat quality obtained by DSC measurement of MCMB/P(VdF/HFP) mixture (a1 to a5), MCMB/porous P(VdF/HFP) mixture (b1 to b5) and untreated MCMB(c).

From the foregoing DSC curve was determined heat quantity at around 120° C. attributed to the reaction of MCMB inserting lithium with the solvent in electrolyte. The relationship between the content of P(VdF/HFP) in MCMB/P(VdF/HFP) mixture and the heat quantity is shown in FIG. 11. MCMB/P(VdF/HFP) mixtures a1 to a5 and by to b5 showed a drastic decrease in heat quantity compared with that of untreated MCMB (c) MCMB/P(VdF/HFP) mixtures a4 and b4, which have a P(VdF/HFP) content of 4 wt-%, showed a heat quantity of 10% or less of that of untreated MCMB (c). Further, MVMB/porous P(VdF/HFP) mixtures (b1 to b5) showed a further decrease in heat quantity compared with that of non-porous MVMB/P(VdF/HFP) mixtures (a1 to a5).

This is because the presence of a polymer film on the interface between the carbon particle and electrolyte makes it possible to inhibit the reaction of the carbon particle inserting lithium with the solvent in electrolyte. The reason why the heat quantity of MCMB/porous P(VdF/HFP) mixtures (b1 to b5) is lower than that of non-porous MCMB/P(VdF/HFP) mixtures (a1 to a5) is presumably that lithium ions can smoothly move through the electrolyte in the pores of P(VdF/HFP) provided in MCMB/porous P(VdF/HFP) mixtures (b1 to b5, making the current density on the surface of MCMB/porous P(VdF/HFP) mixtures (b1 to b5) more uniform than that of MCMB/P(VdF/HFP) mixtures (a1 to a5) and hence making it possible to effect intercalation of lithium ions uniformly on the entire surface of MCMB so that when MCMB/porous P(VdF/HFP) mixtures (b1 to b5) are charged to the state of $Li_{0.7}C_6$, the amount of the portion which is charged to the state of $Li_xC_6$ (x>0.7) is reduced as compared with MCMB/P(VdF/HFP) mixtures (a1 to a5). It is thus shown that MCMS/P(VdF/HFP) mixtures (a1 to a5) and MCMB/porous P(VdF/HFP) mixtures (b1 to b5) exhibit improved safety performance as compared with untreated MCMB (c).

Example 4

Simpler processes for the preparation of MCMB having different polymer contents will be described hereinafter. MCMB/P(VdF/HFP) mixtures (d1 to d7) were prepared in the same manner as at the eleventh step of Example 3 by mixing 100 g of MCMB and P(VdF/HFP)/NMP solutions (S1 to S7 in Table 12) prepared at the tenth step of Example 3 under a reduced pressure of 0.1 Torr. MCMB/P(VdF/HFP) mixture prepared from P(VdF/HFP)/NMP solution S1 set forth in Table 12 is designated as d1, that using solution 52 is designated as d2, and that using solution S5 is designated as d3, and so forth. Since the eleventh step was effected once, d3 was the same as a1.

Further, MCMB/porous P(VdF/HFP) mixtures (e1 to e7) were prepared from 100 g of MCMB and P(VdF/HFP)/NMP solutions having different concentrations (S1 to S7 in Table 12) prepared at the eleventh step of Example 3 in the same manner as the twelfth step of Example 3. Since the eleventh step was effected once, e3 was the same as b1.

Figure 12:
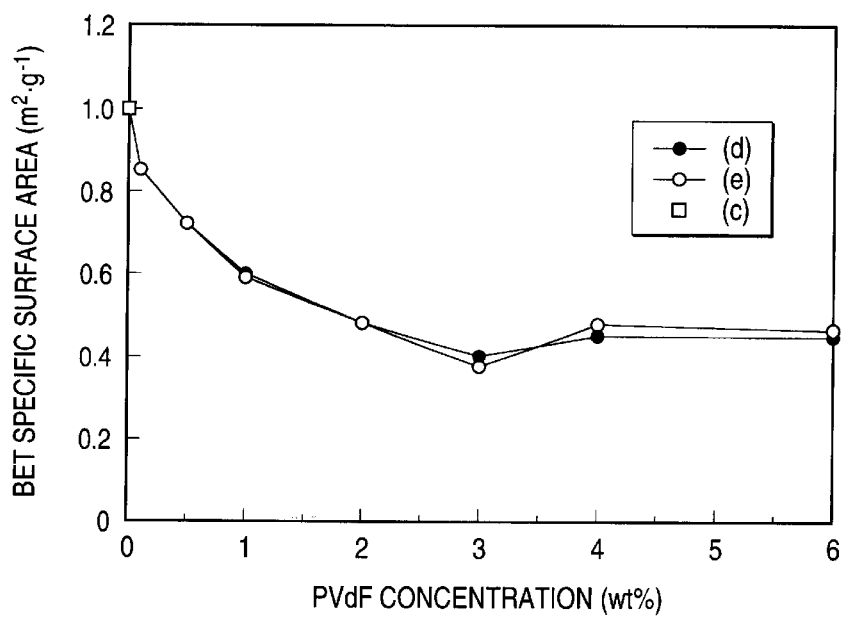
FIG. 12 illustrates the relationship between the content of polymer electrolyte and BET specific surface area of MCMB/P(VdF/HFP) mixture (a1 to a5), MCMB/porous P(VdF/HFP) mixture (b1 to b5) and untreated MCMB(c).

FIG. 12 shows BET specific surface area of these samples. It was found that MCMB provided with P(VdF/HFP) has a reduced BET specific surface area. It is thought that the reduction of specific surface area provides the negative electrode with improved safety performance and lowered irreversible capacity.

Negative electrodes were prepared from MCMB/P(VdF/HFP) mixtures (d1 to d7) and MCMB/porous P(VdF/HFP) mixtures (e1 to e7) used as their active materials in the same manner as at the thirteenth step of Example 3. These negative electrodes were then each subjected to charge-discharge test in the same manner as in Example 3. These samples were each then subjected to DSC in the same manner as in Example 3.

Figure 13:
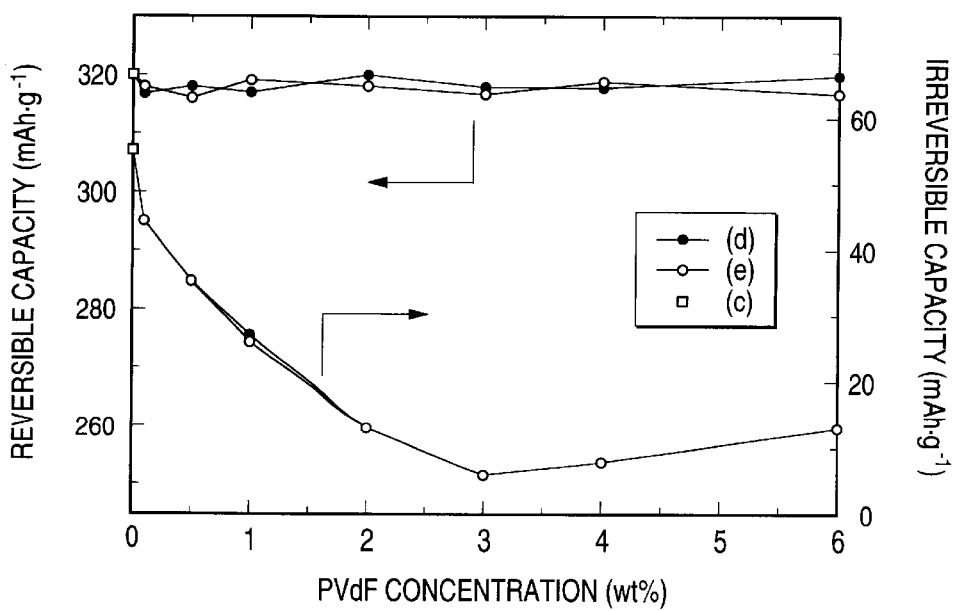
FIG. 13 illustrates the relationship between the concentration of P(VdF/HFP)/NMP solution and the reversible capacity and irreversible capacity of MCMB/P(VdF/HFP) mixture (d1 to d7), MCMB/porous P(VdF/HFP) mixture (e1 to e7) and untreated MCMB(c).
Figure 14:
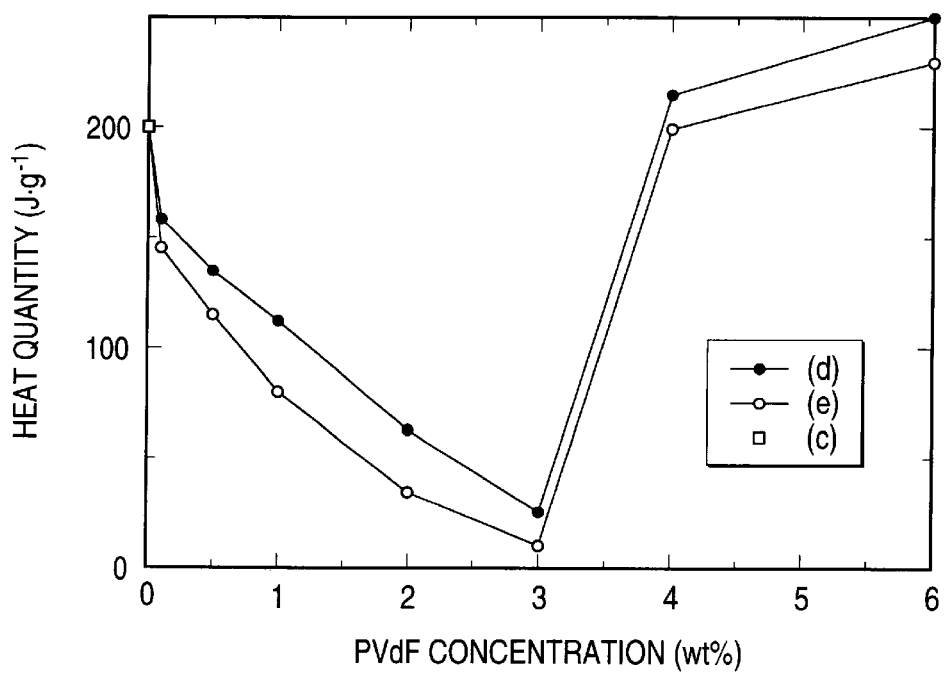
FIG. 14 illustrates the relationship between the content of polymer electrolyte and the heat quantity obtained by DSC measurement of MCMB/P(VdF/HFP) mixture (d1 to d7, MCMB/porous P(VdF/HFP) mixture (e1 to e7) and untreated MCMB(c).

The relationship between the reversible capacity and irreversible capacity of negative electrodes comprising as active material of MCMB/P(VdF/HFP) mixtures (d1 to d7), MCMB/porous P(VdF/HFP) mixtures (e1 to e7) and untreated MCMB (c) and the concentration of P(VdF/HFP)/NMP solution used to prepare these active materials is shown in FIG. 13. The relationship between the concentration of P(VdF/HFP)/NMP solution and the heat quantity on DSC curve at around 120° C. is shown in FIG. 14.

As can be seen in these results, MCMB/P(VdF/HFP) mixtures (d1 to d7) and MCMB/porous P(VdF/HFP) mixtures (e1 to e7) show a reduction of irreversible capacity and heat quantity with an increase in the content of P(VdF/HFP) in MCMB, similarly to MCMB/P(VdF/HFP) mixtures (a1 to a5 and MCMB/porous P(VdF/HFP) mixtures (b1 to b5) described in Example 3. This is presumably attributed to the fact that MCMB provided with P(VdF/HFP) has a reduced specific surface area. MCMB/porous P(VdF/HFP) mixtures (e1 to e7) exhibit a further reduction of heat quantity as compared with MCMB/non-porous P(VdF/HFP) mixtures (d1 to d7) as in the case of Example 3.

However, MCMB/P(VdF/HFP) mixtures (d6, d7) and MCMB/porous P(VdF/HFP) mixtures (e6, e7) prepared from P(VdF/HFP)/NP solutions having a P(VdF/HFP) concentration of 4 wt-% or more (S6, S7 in Table 12) were observed to show a slight increase in irreversible capacity and a drastic increase in heat quantity due to the reaction of MCMB inserting lithium with the solvent in electrolyte as compared with MCMB/P(VdF/HFP) mixtures (d5, e5) prepared from P(VdF/HFP)/NMP solution having a P(VdF/HFP) concentration of 3 wt-% (S5 in Table 12).

This is presumably because when MCMB and P(VdF/HFP)/NMP solution are mixed under a reduced pressure condition in such a manner that the resulting P(VdF/HFP)/NMP solution has a higher viscosity, P(VdF/HFP)/P solution cannot penetrate into narrow portions of MCMB particles, giving MCMB particles which are not coated with P(VdF/HFP). However, the reason why MCMB/P(VdF/HFP) mixtures prepared from P(VdF/HFP)/NMP solutions having a high viscosity show a drastic increase in heat quantity as compared with those prepared from P(VdF/HFP)/NMP solutions having a low viscosity is unknown.

As can be seen in Table 12, since the viscosity of P(VdF/HFP)/NMP solutions exceeds 20 mPa·s when the concentration of P(VdF/HFP) is 4 wt-% or more, the viscosity of P(VdF/HFP)/NMP solution should be 20 mPa·s or less to produce MCMB provided with P(VdF/HFP) by dipping MCMB in P(VdF/HFP)/NMP solution.

Regardless of the kind of the organic solvent or polymer to be incorporated in the polymer solution, when the viscosity of the polymer solution is 20 mPa·s or less, the carbon particle provided with a polymer on the surface thereof according to the invention can be obtained.

The irreversible capacity and heat quantity of MCMB/P(VdF/HFP) mixtures (d1, e1) prepared from P(VdF/HFP)/NMP solution (S1 in Table 12) having a P(VdF/HFP) concentration of 0.1 wt-% show a decrease in about 20% from those of untreated MCMB (c) despite their P(VdF/HFP) content of as small as about 0.04 wt-%.

It was thus made obvious that even when the content of P(VdF/HFP) in P(VdF/HFP)/NMP solution is 0.04 wt-%, the irreversible capacity at the negative electrode can be reduced, and the reaction of carbon particles inserting lithium with the solvent in electrolyte can be inhibited, making it possible to improve safety performance.

Example 5

In order to confirm the safety performance of MCMB/P(VdF/HFP) mixtures alto a5 and d1 to d5 prepared in Example 3 and MCMB/porous P(VdF/HFP) mixtures b1 to b5 and e1 to e5 prepared in Example 4, 10 samples were prepared for each of non-aqueous electrolyte batteries comprising these mixtures as negative electrode. As shown in FIG. 14, MCMB/P(VdF/HFP) mixtures (d6, d7) and MCMB/porous P(VdF/HFP) mixtures (e6, e7) were observed to show a drastic increase in heat quantity due to the reaction of MCMB inserting lithium, with the solvent in electrolyte and thus were not subjected to safety performance test.

The positive electrode provided with an active material layer on both sides thereof was prepared by coating a paste obtained by mixing 70 wt-% of lithium cobaltate, 6 wt-% of acetylene back, 9 wt-% of PVdF and 15 wt-t of NMP to an aluminum foil having a width of 100 mm, a length of 480 mm and a thickness of 20 μm on both sides thereof, and then drying the coated material at a temperature of 150° C. to evaporate NMP. Thereafter, the positive electrode was pressed to reduce its thickness from 280 m to 175 μm, and then cut into a size of 19 mm wide×480 mm long.

The negative electrode provided with an active material layer on both sides thereof was prepared by coating a paste obtained by mixing 81 wt-% of the various MCMB/P(VdF/HFP) mixtures prepared in Examples 3 and 4, 9 wt-% of PVdF and 10 wt-% of NMP to a copper foil having a width of 80 mm, a length of 500 mm and a thickness of 14 μm on both sides thereof, and then drying the coated material at a temperature of 150° C. to evaporate NMP. Thereafter, the negative electrode was pressed to reduce its thickness from 300 μm to 190 μm, and then cut into a size of 20 mm wide×500 mm long.

The positive electrode and negative electrode thus prepared and a polyethylene separator having a thickness of 30 μm and a width of 22 mm were wound, and then inserted into a stainless steel case having a height of 47.0 mm, a width of 22.2 mm and a thickness of 6.4 mm. Into the case was then injected an electrolyte obtained by adding a 1 mol/l $LiPF_6$ to a 1:1 mixture (by volume) of ethylene carbonate and dimethyl carbonate to prepare a battery having a nominal capacity of 400 mAh. The battery case was provided with an irreversible safety valve.

These batteries were each subjected to safety performance test. At room temperature, these batteries were each charged with a current of 400 mA to 4.5 V, charged at a constant voltage of 4.5 V for 2 hours, and then externally short-circuited.

As a result, none of 10 samples of each of non-aqueous electrolyte batteries comprising MCMB/P(VdF/HFP) mixtures a1 to a5, b1 to b5, d1 to d7 and e1 to e7 of the invention as a negative active material had its safety valve operated and underwent smoking. On the contrary, the conventional known battery prepared with untreated MCMS (c) had its safety valve operated and underwent smoking/firing.

It was thus made obvious that non-aqueous electrolyte batteries comprising MCMB/P(VdF/HFP) mixture of the invention as a negative active material exhibit improved safety performance as compared with those comprising untreated MCMB Example 6

Subsequently, a $LiCoO_2$/porous P(VdF/HFP) mixture was prepared. In some detail, 100 g of $LiCoO_2$ and 150 ml of P(VdF/HFP)/NMP solution S3 (10 wt-%) prepared at the tenth step were mixed. The mixture was kept under a reduced pressure of 0.1 Torr for 30 minutes so that P(VdF/HFP)/NMP solution was retained in the voids between $LiCoO_2$ particles. The mixture of $LiCo_2$, and P(VdF/HFP)/NMP solution was withdrawn, and then subjected to filtration with suction to remove excess P(VdF/HFP)/NMP solution. Thereafter, $LiCoO_2$/P(VdF/HFP)/NMP mixture was dipped in water for 10 minutes according to the solvent extraction method, dried at a temperature of 100° C. to remove water and NMP, and then vacuum-dried to obtain $LiCoO_2$/porous P(VdF/HFP) mixture (hereinafter designated as "f1")

Subsequently, $LiCoO_2$/porous P(VdF/HFP) mixture (f1) and untreated $LiCoO_2$ (g) were used as active material to prepare a positive electrode having a size of 15 mm×15 mm. In some detail, a paste obtained by mixing the foregoing active materials, acetylene back, PVdF and NMP at a ratio of 70:6:9:15 (wt-%) was applied to an aluminum mesh substrate, and then dried at a temperature of 100° C. to evaporate NMP. The substrate thus coated was then pressed to a positive electrode having a thickness of 200 µm.

The positive electrode thus prepared and metallic lithium electrodes as a reference electrode and a counter electrode were then assembled in a glass cell for testing positive electrode. As the electrolyte there was used one obtained by adding a 1 mol/l $LiClO_2$ to a 1:1 (by volume) mixture of ethylene carbonate and dimethyl carbonate.

Using this glass cell, charge-discharge test, was performed. In some detail, 1st cycle charging was carried out with a constant current of 0.2 CmA to 4.2 V and then at a constant voltage of 4.2 V for 10 hours in total. Subsequently, 1st cycle discharging was carried out with a constant current of 0.2 CmA to 3.0 V. Under the same conditions as above, charge and discharge at 2nd cycle were carried out. Subsequently, 3rd cycle charging was carried out with a constant current of 0.2 CmA until the composition of the active material reached a condition of $Li_{0.5}CoO_2$.

Figure 15:
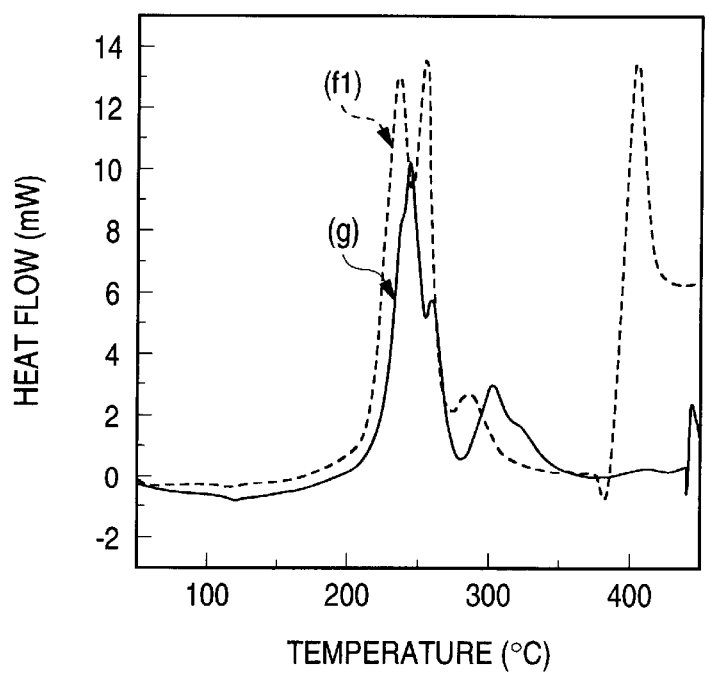
FIG. 15 is DSC curves of LiCoO$_2$/porous P(VdF/HFP) mixture (f1) and untreated MCMB(g).

The thermal stability of $LiCoO_2$/porous P(VdF/HFP) mixture (f1) in charged state at 3rd cycle (in the state of $Li_{0.5}CoO_2$) was then measured. 0.4 mg of $LiCoO_2$/porous P(VdF/HFP) mixture (f1) in charged state after the 3rd cycle charging and 1.2 mg of an electrolyte (1:1 (by volume) mixture of ethylene carbonate and dimethyl carbonate+1 mol/l $LiPF_6$) were encapsulated in an SUS container, and then subjected to measure DSC. DSC curves of $LiCoO_2$/porous P(VdF/HFP) mixture (f1) and untreated $LiCoO_2$ (g) are shown in FIG. 15. The exothermic peak observed on DSC curve of untreated $LiCoO_2$ (g) at around 200° C. to 300° C. is considered to be attributed to the reaction of $Li_xCoO_2$ with the electrolyte (Solid State Ionics, 69 (1994) 265, Journal of Power Sources, 70 (1998) 16). The heat generation at around 440° C. is considered to be attributed to the decomposition of PVdF as a binder. On the other hand, DSC curve of $LiCoO_2$/porous P(VdF/HFP) mixture (f1) was observed to have heat generation due to the reaction of $Li_xCoO_2$ with the electrolyte at around 200° C. to 300° C. as in the case of untreated $LiCoO_2$. A great exothermic peak was further observed at around 400° C. This exothermic peak is considered to be attributed to the decomposition of P(VdF/HFP) coated on the surface of $LiCoO_2$. The reason why the heat quantity by the decomposition of P(VdF/HFP) coated on the surface of $LiCoO_2$ is greater than that of PVdF as a binder is unknown. However, since the battery comprising $LiCoO_2$/porous P(VdF/HFP) mixture has improved safety performance as compared with the conventional batteries as already mentioned in Example 2, it is thought that the battery comprising $LiCoO_2$/porous P(VdF/HFP) mixture is not liable to effect of heat generation at a temperature as high as 400° C. on the safety performance thereof because the current distribution at the positive electrode is so uniform that the battery temperature doesn't rise so much during external short circuit.

INDUSTRIAL APPLICABILITY

The use of the present application makes it possible to improve the high rate discharge performance and cyclability of the battery and produce a battery having a great capacity density and an excellent safety performance.

What is claimed is:

1. A composite active material provided with a polymer on the surface of an active material in an amount of from 0.01% to 5% by weight, wherein said polymer is a porous polymer, said polymer on the surface of said active material is formed before mixing said composite active material with a binder, and said active material is a positive active material.

2. The composite active material according to claim 1, wherein said positive active material is at least one selected from the group consisting of $LiCoO_2$, $LiNiO_2$, $LiMn_2O_4$, and NiOOHLi.

3. A composite active material provided with a polymer on the surface of a carbon-based active material in an amount of from 0.04% to 4% by weight, wherein said polymer is a porous polymer, said carbon-based active material includes at least one material selected from the group consisting of graphitizable carbon, non-graphitizable carbon, and graphite-based material, and said polymer on the surface of said active material is formed before mixing said composite active material with a binder.

4. The composite active material according to any one of claims 1 and 3, wherein said polymer contains fluorine.

* * * * *